United States Patent [19]
Matsumoto et al.

[11] Patent Number: 5,619,742
[45] Date of Patent: Apr. 8, 1997

[54] PHOTOGRAPHIC PROCESSING CONDITION MANAGING METHOD, AND METHOD AND APPARATUS FOR MANAGING IMAGE FORMING DEVICES

[75] Inventors: Nobuo Matsumoto; Takaaki Terashita; Fumio Mogi; Noboru Sasaki; Takatoshi Ishikawa, all of Kanagawa, Japan

[73] Assignee: Fuji Photo Film Co., Ltd., Kanagawa, Japan

[21] Appl. No.: 559,289

[22] Filed: Nov. 15, 1995

[30]    Foreign Application Priority Data

Nov. 18, 1994 [JP] Japan .................................. 6-285626

[51] Int. Cl.⁶ ............................................. G03D 13/00
[52] U.S. Cl. ............................ 396/569; 355/77; 396/570; 396/639
[58] Field of Search ............................. 354/298, 324; 355/38, 68, 77; 396/569, 570, 578, 639

[56]    References Cited

U.S. PATENT DOCUMENTS

| | | | |
|---|---|---|---|
| 4,657,378 | 4/1987 | Hope et al. | 355/38 |
| 4,809,198 | 2/1989 | Terashita | 355/38 |
| 5,083,153 | 1/1992 | Tokuda | 355/77 |
| 5,083,154 | 1/1992 | Terashita et al. | 355/68 |
| 5,319,408 | 6/1994 | Shiota | 396/569 |
| 5,353,095 | 10/1994 | Terashita | 355/38 |
| 5,440,365 | 8/1995 | Gates et al. | 396/569 |
| 5,452,040 | 9/1995 | Nishida et al. | 396/569 |

FOREIGN PATENT DOCUMENTS

| | | | |
|---|---|---|---|
| 3291643 | 12/1991 | Japan | G03B 27/72 |
| 536775 | 5/1993 | Japan | G03B 27/72 |
| 675311 | 3/1994 | Japan | G03B 27/73 |

Primary Examiner—D. Rutledge
Attorney, Agent, or Firm—Sughrue, Mion, Zinn, Macpeak & Seas

[57]    ABSTRACT

A photographic processing condition managing method applied to an image forming device equipped with a function for immersing a photosensitive material for photographing into a processing solution for photosensitive materials for photographing so as to process the photosensitive material for photographing. The method includes the steps of: for a photosensitive material for photographing, which has been used for photographing and on which an image has been exposed and which has been immersed into and processed by a processing solution for photosensitive materials for photographing at an image forming device, dividing at least one of the image developed on the photosensitive material for photographing and a portion of the photosensitive material for photographing other than the image into a plurality of colors, and measuring a density of each color, and storing a measured density value of each color, and repeating the steps of dividing, measuring and storing; and determining a state of the processing solution for photosensitive materials for photographing of the image forming device on the basis of an average value of the stored density values, which average value is calculated each time a predetermined period of time elapses. Accordingly, the state of the processing solution for photosensitive materials for photographing can be determined without using a control strip or the like, and can be managed easily and appropriately.

23 Claims, 18 Drawing Sheets

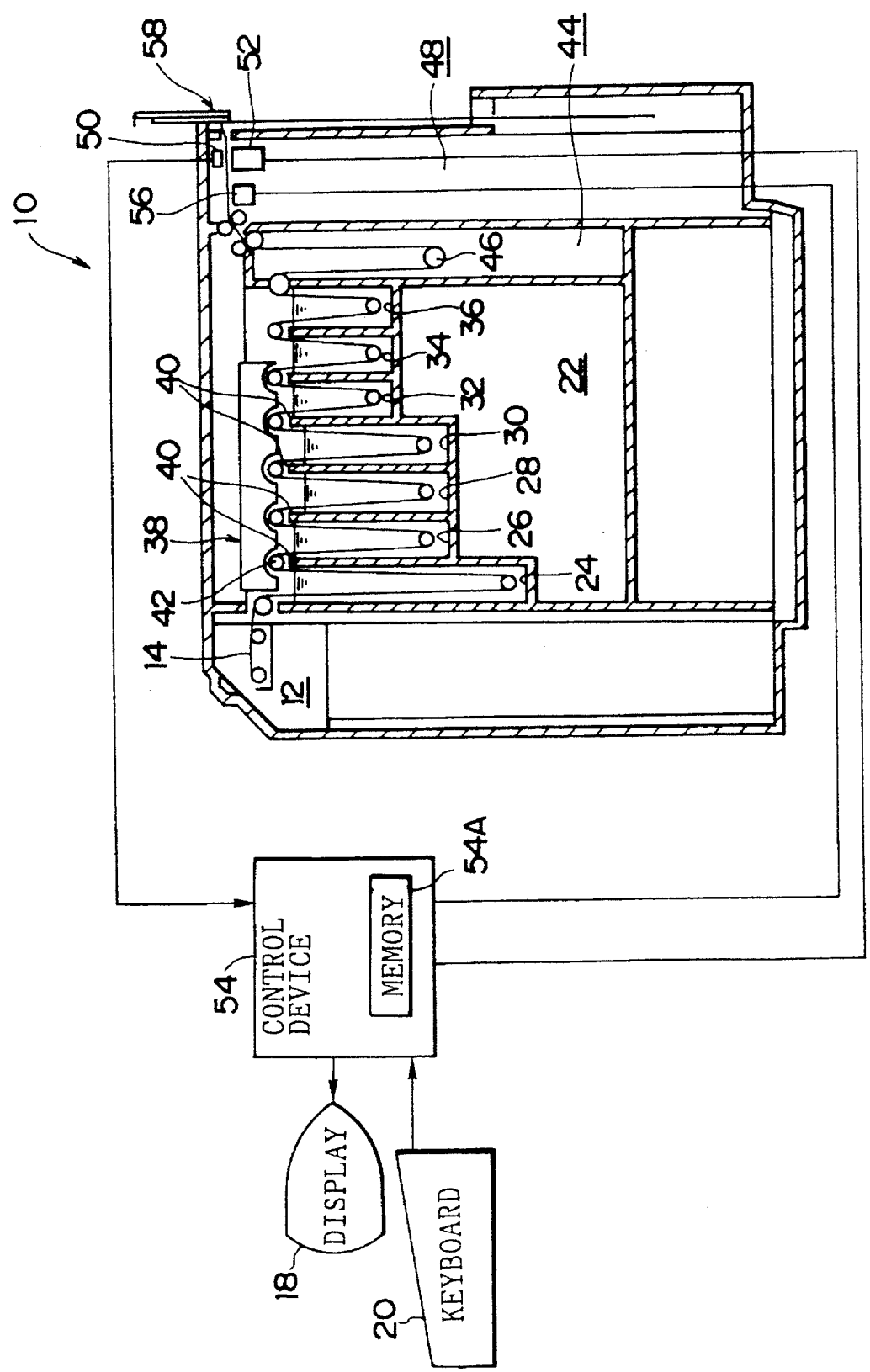

FIG. 10A
DEVELOPING TIME BY COLOR DEVELOPING SOLUTION
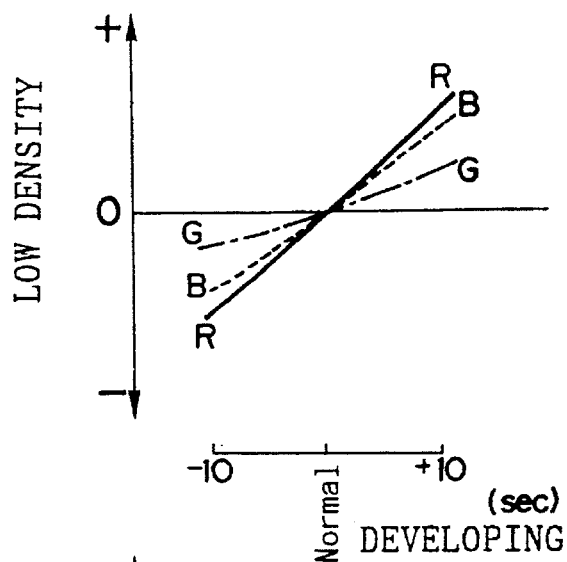
FIG. 10B
TEMPERATURE OF COLOR DEVELOPING SOLUTION
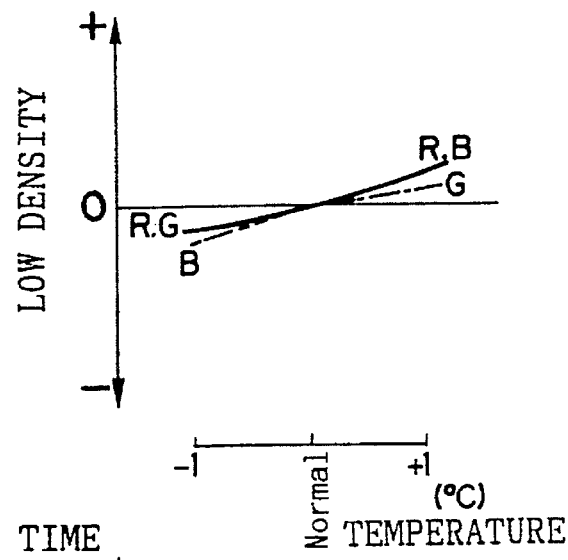
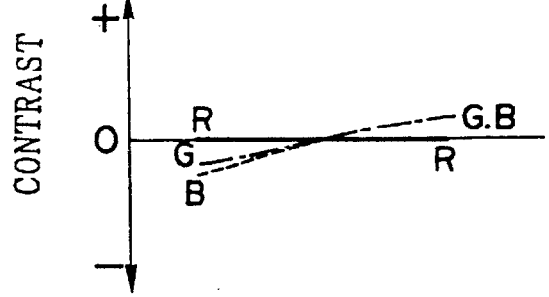
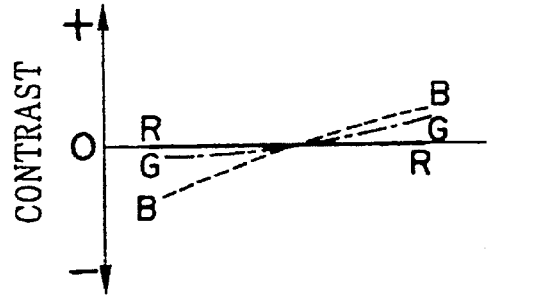
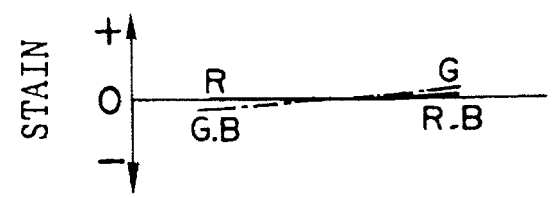
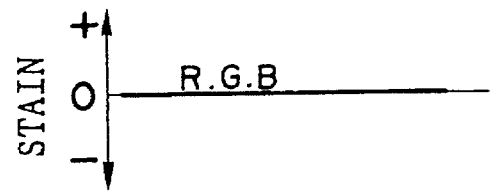
WHEREIN
R ———
G —·—·—
B - - - - -

FIG. 11A
pH OF COLOR DEVELOPING SOLUTION
FIG. 11B
MIXING OF COLOR DEVELOPING SOLUTION
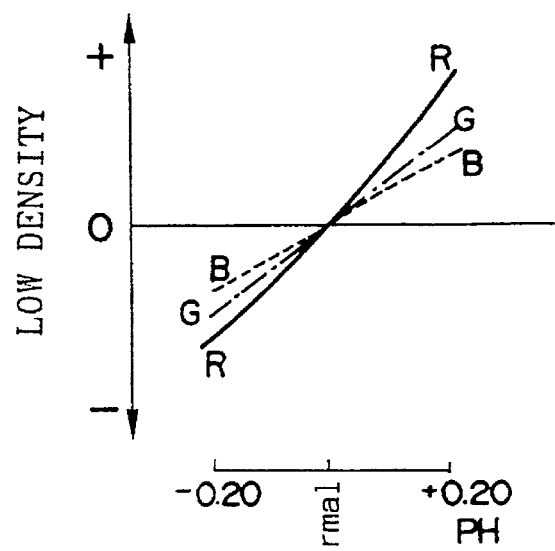
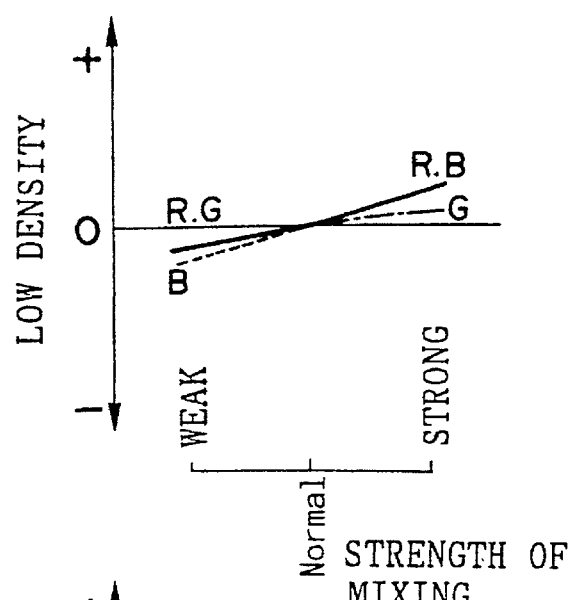
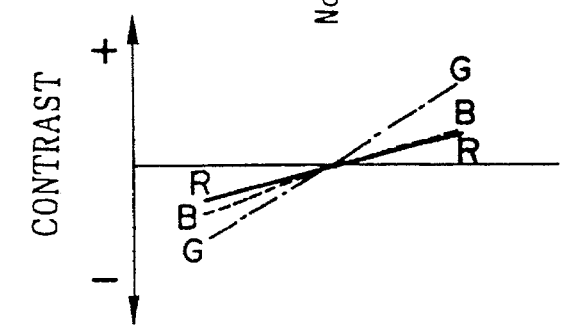
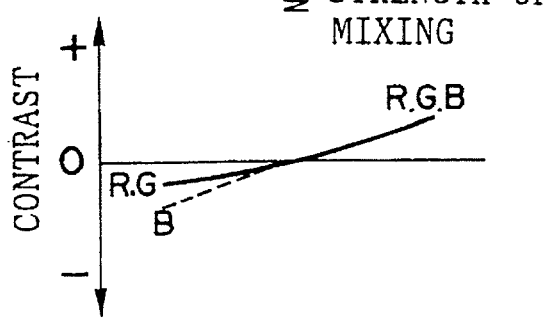
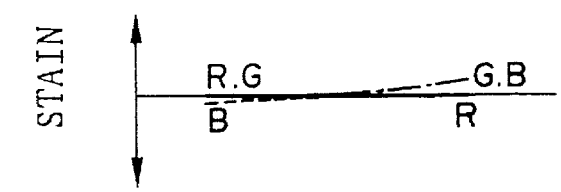
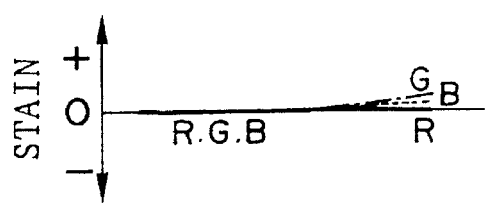
WHEREIN
R ———
G —·—·—
B - - - - -

FIG. 12A
AMOUNT OF REPLENISHING SOLUTION REPLENISHED TO COLOR DEVELOPING SOLUTION
FIG. 12B
MIXING OF BLEACHING/FIXING SOLUTION IN COLOR DEVELOPING SOLUTION
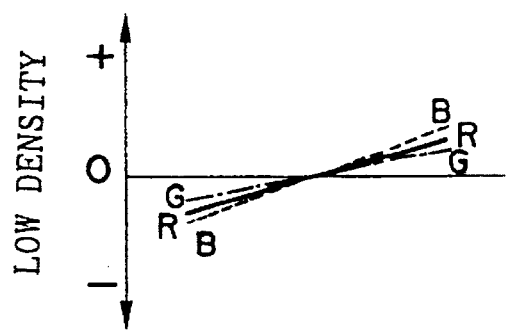
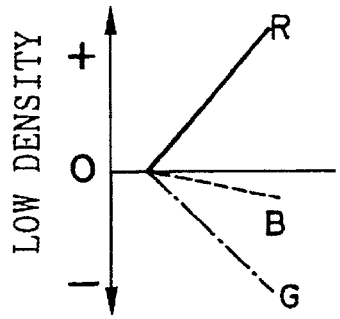
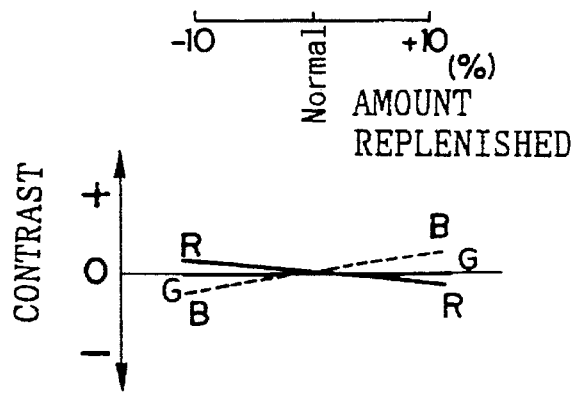
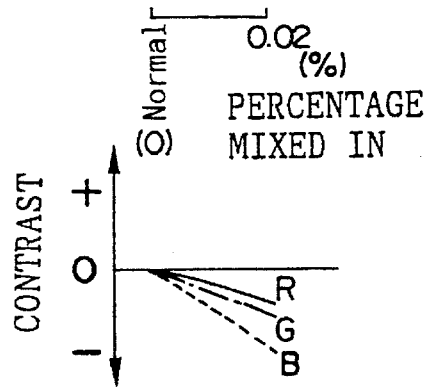
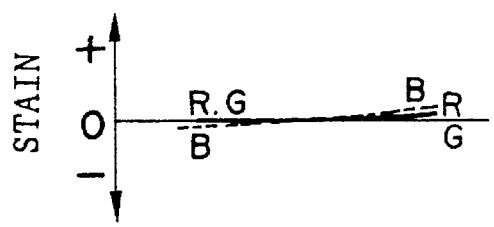
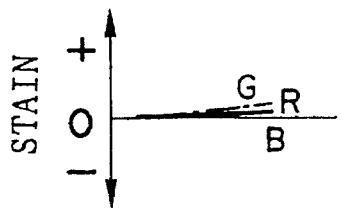
WHEREIN
R ———
G —·—·—
B - - - - -

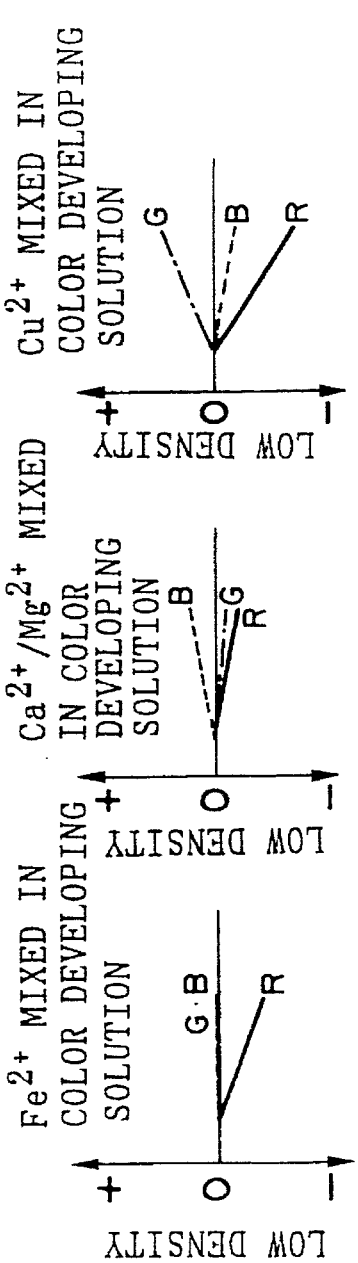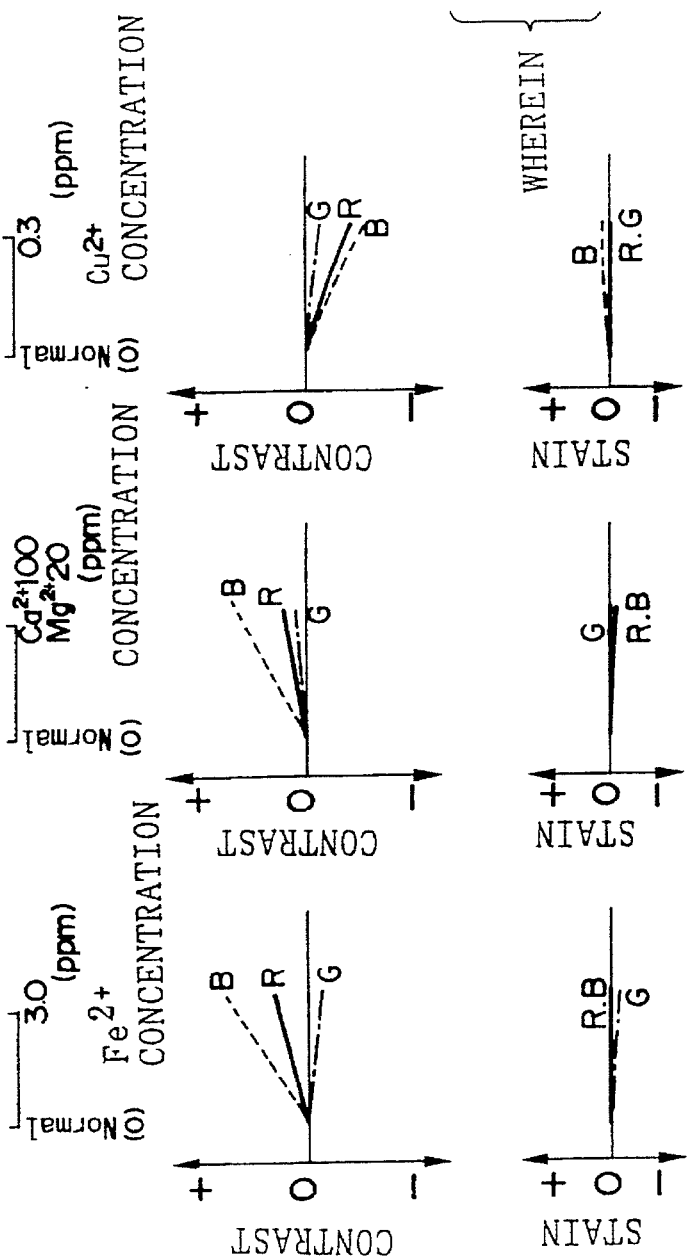

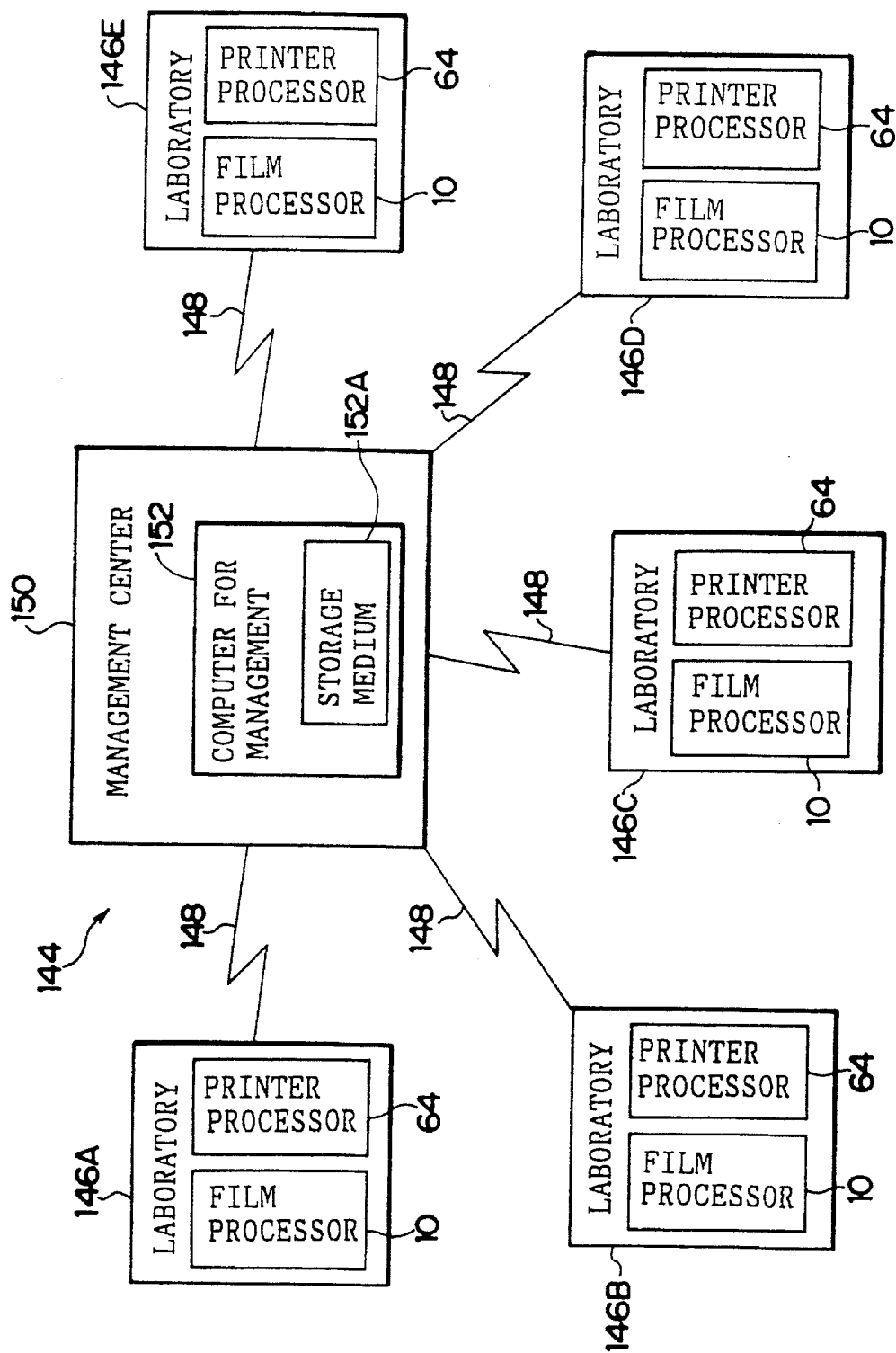

PHOTOGRAPHIC PROCESSING CONDITION MANAGING METHOD, AND METHOD AND APPARATUS FOR MANAGING IMAGE FORMING DEVICES

BACKGROUND OF THE INVENTION

1. Field of the Invention

The present invention relates to a photographic processing managing method and to a method and apparatus for managing image forming devices, and in particular, relates to a photographic processing condition managing method which determines the state of a processing solution in an image forming device and manages the processing conditions, and to a method and apparatus for managing image forming devices which manage each of a plurality of image forming devices.

2. Description of the Related Art

In photographic processing, usually, a negative film on which images are photographed (exposed) is immersed by a film processor in various types of processing solutions so as to undergo processing, and the images developed on the negative film are exposed onto a photographic printing paper by a color printer. The photographic printing paper on which the images are exposed is immersed by a paper processor in various types of processing solutions so as to undergo processing. Prints corresponding to the photographed images are thereby obtained. Over a long period of use, the performance of the processing solutions such as developing solution deteriorates due to effects such as excess or deficient replenishing solution, oxidization of the replenishing solution, evaporation of the processing solution, contaminating by solutions of previous processes, and the like. Accordingly, in order to always maintain the quality of the prints at a satisfactory level, it is necessary to always manage the states of the processing solutions of the film processor and the paper processor.

Conventionally, a film processor control strip, which is formed by exposing a plurality of images onto a film at various different conditions, is processed at the film processor. A paper processor control strip, which is formed by exposing a plurality of images onto a photographic printing paper at various different conditions, is processed at the paper processor. The densities of the images appearing on the processed control strips are respectively measured. The measured image densities are compared with a reference density, and the states of the processing solutions of each of the processors are managed.

However, managing the states of the processing solutions by using control strips must be carried out periodically, and accordingly, the burden on the operator is great. Further, much work is involved in manufacturing the control strips, and the handling thereof is troublesome because the control strips must be stored such that fogging or the like does not occur. Moreover, even if the control strips are stored such that fogging or the like does not occur, the control strips gradually deteriorate as time passes from the time they are manufactured. Therefore, a drawback arises in that the evaluation of the states of the processing solutions varies in accordance with the rate of deterioration of the control strips.

Accordingly, Japanese Patent Application Laid-Open No. 3-291643 discloses successively storing and accumulating data regarding the states of the exposure section and the developing section of a photographic processing device such as a printer processor, together with the times at which the data was stored, and displaying the stored contents in time sequence. Although preparation and the like of a management chart for managing the states of the processing solutions is thereby facilitated, the control strips must still be used. Therefore, the complex work involved in storing the control strips and the like in order to determine and manage the states of the processing solutions is necessary.

In order to obtain high quality prints, in addition to managing the states of the processing solutions as described above, it is also necessary to set appropriate reference exposure conditions as the reference exposure conditions used in calculating the exposure conditions at the printer. Therefore, although work for setting the reference exposure condition is carried out when the printer is installed, the appropriate exposure conditions vary when photographic printing papers of different paper types or lots are used, or when the exposure lamp is changed, or when a processing solution is changed, or in other such cases. Therefore, it is necessary to correct the reference exposure conditions.

Setting and correction of the reference exposure conditions is carried out by comparing the density of a test print, which is exposed and developed from a condition setting film, and the density (target density) of a reference print, which is exposed and developed in advance (see, for example, Japanese Patent Application Publication No. 5-36775). Films which have a portion, which corresponds to the average color of a photographed subject, at the periphery of a portion, which corresponds to a negative in which a gray subject has been photographed, or the like can be used as the condition setting film. Further, a color printer has been proposed in which, when a developed test print is set, the density of the set test print is automatically measured, and the reference exposure conditions are automatically corrected (see Japanese Patent Application Laid-Open No. 6-75311).

SUMMARY OF THE INVENTION

The present invention was developed in view of the aforementioned, and an object thereof is to provide a photographic processing condition managing method which can manage the states of processing solutions easily and appropriately.

Another object of the present invention is to provide a method and apparatus for managing image forming devices in which the states of processing solutions and the exposure conditions of each of a plurality of image forming devices can be managed easily and appropriately.

A first aspect of the present invention is a photographic processing condition managing method applied to an image forming device equipped with a function for immersing a photosensitive material for photographing into a processing solution for photosensitive materials for photographing so as to process the photosensitive material for photographing, the method comprising the steps of: for a photosensitive material for photographing, which has been used for photographing and on which an image has been exposed and which has been immersed into and processed by a processing solution for photosensitive materials for photographing at an image forming device, dividing at least one of the image developed on the photosensitive material for photographing and a portion of the photosensitive material for photographing other than the image into a plurality of colors, and measuring a density of each color, and storing a measured density value of each color, and repeating the steps of dividing, measuring and storing; and determining a state of the processing solution for photosensitive materials for photographing of the image forming device on the basis of an average value of the stored density values, which average value is calculated each time a predetermined period of time elapses.

A second aspect of the invention is a photographic processing condition managing method applied to an image forming device equipped with a function for immersing a photosensitive material for printing in a processing solution for photosensitive materials for printing so as to process the photosensitive material for printing, the method comprising the steps of: immersing an unexposed photosensitive material for printing into a processing solution for photosensitive materials for printing so as to process the photosensitive material for printing in an image forming device, and dividing a density of the processed photosensitive material for printing into a plurality of colors and measuring the densities, and storing the measured density values, and periodically repeating the steps of immersing, dividing and measuring, and storing; and determining a state of the processing solution for photosensitive materials for printing, of the image forming device, on the basis of the stored density values.

A third aspect of the present invention is a photographic processing condition managing method applied to an image forming device equipped with a function for immersing a photosensitive material for printing into a processing solution for photosensitive materials for printing so as to process the photosensitive material for printing, the method comprising the steps of: for a photosensitive material for printing, on which an original image has been exposed at predetermined exposure conditions and which has been immersed into an processed by a processing solution for photosensitive materials for printing at an image forming device, dividing a density for an image developed on the photosensitive material for printing into a plurality of colors and measuring the densities, and storing the measured density values of the respective colors together with results of measuring density values of the original image for the respective colors and exposure conditions at the time the original image was exposed onto the photosensitive material for printing, and repeating the steps of dividing and measuring, and storing; and determining a state of the processing solution for photosensitive materials for printing, of the image forming device, on the basis of the stored density values of the image on the photosensitive material for printing, the stored density values of the original image, and the stored exposure conditions.

A fourth aspect of the present invention is a photographic processing condition managing method applied to an image forming device equipped with a function for immersing a photosensitive material for photographing into a processing solution for photosensitive materials for photographing so as to process the photosensitive material for photographing, a function for exposing an original image recorded on the photosensitive material for photographing onto a photosensitive material for printing, and a function for immersing the photosensitive material for printing into a processing solution for photosensitive materials for printing so as to process the photosensitive material for printing, the method comprising the steps of: automatically immersing a photosensitive material for photographing on at least a portion of which a reference image has been exposed into a processing solution for photosensitive materials for photographing so as to process the photosensitive material for photographing, and automatically exposing the reference image developed on the photosensitive material for photographing onto a photosensitive material for printing at predetermined exposure conditions, and automatically immersing the exposed photosensitive material for printing into a processing solution for photosensitive materials for printing so as to process the photosensitive material for printing, and automatically dividing the densities of the reference images developed on the photosensitive material for photographing and the photosensitive material for printing into a plurality of colors and measuring the densities, and automatically storing the measured density values of the respective reference images for the respective colors and the predetermined exposure conditions; and determining a state of the processing solution for photosensitive materials for photographing on the basis of the stored density values of the reference image on the photosensitive material for photographing, and determining a state of the processing solution for photosensitive materials for printing on the basis of the stored density values of the reference image on the photosensitive material for printing, the stored density values of the image on the photosensitive material for photographing, and the stored exposure conditions.

In the fifth aspect of the present invention, in either the third or the fourth aspect, the image forming device is equipped with a function for exposing an original image onto a photosensitive material for printing at reference exposure conditions set in advance, and the state of the processing solution for photosensitive materials for printing is determined on the basis of a determining formula for calculating the state of the processing solution for photosensitive materials for printing whose parameters are determined by using the reference exposure conditions, and on the basis of the density values of the image on the photosensitive material for printing, and on the basis of the density values of one of the original image and a reference image on a photosensitive material for photographing, and on the basis of the exposure conditions, and each time the reference exposure conditions are corrected, the parameters are changed by using the changed reference exposure conditions.

In the sixth aspect of the present invention, either the first or the fourth aspect includes steps of: detecting at least one of variables which effect a composition of the processing solution for photosensitive materials for photographing and variables expressing characteristics of the processing solution for photosensitive materials for photographing; and determining the state of the processing solution for photosensitive materials for photographing by using the detected variables.

In the seventh aspect of the present invention, any of the second through the fourth aspects includes the steps of: detecting at least one of variables effecting a composition of the processing solution for photosensitive materials for printing and variables expressing the characteristics of the processing solution for photosensitive materials for printing, and determining the state of the processing solution for photosensitive materials for printing by also using the detected variables; analyzing a cause of deviation from a standard state on the basis of the stored information and the detected variables, in a case in which it is determined that the state of the processing solution for photosensitive materials for printing has deviated from the standard state; and changing, on the basis of results of analysis, at least one of exposure conditions at a time of exposing an image onto a photosensitive material for printing and maintaining/managing conditions of the processing solution for photosensitive materials for printing.

An eighth aspect of the present invention is a method for managing image forming devices comprising the steps of:

periodically collecting state data expressing states of processing solutions of a plurality of image forming devices respectively equipped with a function for immersing a photosensitive material in a processing solution so as to process the photosensitive material; and determining the states of the processing solutions of the plurality of image forming devices by comparing the respective state data of the image forming devices with an average value of the state data of the plurality of image forming devices.

A ninth aspect of the present invention is an apparatus for managing image forming devices for managing each of a plurality of image forming devices respectively equipped with a function for exposing an original image onto a photosensitive material for printing and a function for immersing the photosensitive material for printing into a processing solution for photosensitive materials for printing so as to process the photosensitive material for printing, the apparatus comprising: receiving means for receiving density values for each color of an image developed on a photosensitive material for printing by exposing an original image onto the photosensitive material for printing and by immersing and processing the photosensitive material for printing in a processing solution for photosensitive materials for printing at each of the plurality of image forming devices, and density values for each color of the original image at each of the plurality of image forming devices, and exposure conditions at the time when the original image is exposed onto the photosensitive material for printing at each of the plurality of image forming devices; calculating means for calculating amounts of correction of the exposure conditions on the basis of values obtained by statistically processing the densities of images on the photosensitive materials for printing received from each of the plurality of image forming devices, the densities of the original images received from each of the plurality of image forming devices, and the exposure conditions received from each of the plurality of image forming devices; and correcting means for correcting the exposure conditions at the time of exposing images onto photosensitive materials for printing at each of the image forming devices, by the amounts of correction calculated by the calculating means.

A tenth aspect of the present invention is an apparatus for managing image forming devices for managing each of a plurality of image forming devices respectively equipped with a function for immersing a photosensitive material on which an image is exposed into a processing solution so as to process the photosensitive material, the apparatus comprising: receiving means for receiving density values for respective colors of images developed on processed photosensitive materials and at least one of variables effecting compositions of processing solutions and variables expressing characteristics of processings solutions, the density values and variables being detected at each of the plurality of image forming devices; determining means for determining states of the processing solutions of the respective image forming devices on the basis of information received from each of the plurality of image forming devices; analyzing means for analyzing a cause of deviation from a standard state on the basis of information received by the receiving means, in a case in which there is an image forming device for which it is determined by the determining means that the state of a processing solution has deviated from the standard state; and calculating means for determining, on the basis of results of analysis by the analyzing means, at least one of an amount of correction of exposure conditions at the time an image is exposed onto a photosensitive material and contents of change of maintaining/managing conditions of the processing solution.

Generally, the densities Dfi of respective colors (e.g., R, G, B) of an image, which is developed on a photosensitive material for photographing by the photosensitive material for photographing being immersed into and processed by a processing solution for photosensitive materials for photographing at an image forming device, vary in accordance with various factors as shown in following formula (1).

$$Dfi = f(S, L, F, Bf, T, Cf) \qquad (1)$$

wherein:

S: photographed subject

L: brightness of illumination at the time of photographing

F: type of photosensitive material for photographing

Bf: lot difference of photosensitive material for photographing

T: history of environment since production

Cf: state of processing solution for photosensitive materials for photographing

Here, among the above factors, the factors other than the state of the processing solution for photosensitive materials for photographing Cf differ for each image or for each photosensitive material for photographing. However, when the densities Dfi of a large number of images are measured and these densities are averaged, the dispersions in the densities Dfi due to these differences are equalized, and a value expressing the state of the processing solution for photosensitive materials for photographing is obtained.

Similarly, the densities Dfb of respective colors of the portion outside of the image region of a photosensitive material for photographing which is processed by an image forming device vary in accordance with various factors as shown in following formula (2).

$$Dfb = f(F, Bf, T, Cf) \qquad (2)$$

Among the above factors, the factors other than the state of the processing solution differ for each photosensitive material for photographing. When the densities Dfb of a large number of photosensitive materials for photographing are measured and these densities are averaged, the dispersions in the densities Dfb due to these difference are equalized, and a value expressing the state of the processing solution for photosensitive materials for photographing is obtained.

On the basis of the above information, in the first aspect of the present invention, for a photosensitive material for photographing, which has been used for photographing and on which an image has been exposed and which has been immersed into and processed by a processing solution for photosensitive materials for photographing at an image forming device, at least one of the image developed on the photosensitive material for photographing and a portion of the photosensitive material for photographing other than the image is divided into a plurality of colors, and a density of each color is measured, and a measured density value of each color is stored, and the steps of dividing, measuring and storing are repeated. The state of the processing solution for photosensitive materials for photographing is determined on the basis of an average value of the stored density values, which average value is calculated each time a predetermined period of time elapses. Examples of the image forming device include a film processor which processing a photographic film serving as a photosensitive material for photographing, a so-called integral-type photographic processing device having both a function for exposing an image of a photographic film onto a photographic printing paper and a function for immersing the photographic printing paper on which the image is exposed into a processing solution so as to process the photographic printing paper, and the like. Examples of the processing solution include developing solution, fixing solution, washing water, and the like.

As described above, the average values of the density values of the image developed on the photosensitive material for photographing and on the portion other than the image can be considered to express the state of the processing solution for photosensitive materials for photographing. Accordingly, the state of the processing solution can be determined on the basis of the average value of the density values each time a predetermined period of time elapses; for example, if the average value varies, the state of the processing solution varies. Because the state of the processing solution is determined by using the photosensitive material for photographing which was used during photographing, there is no need to use a special expendable article such as a control strip or the like for determining the state of the processing solution. Further, there is no need for the work involved in storing the control strip such that fogging or the like does not occur or in setting the control strip periodically at the image forming device. Accordingly, the state of the processing solution can be determined easily, and on the basis of the determined state, the state of the processing solution for photosensitive materials for photographing can be managed easily and appropriately.

The type of the photosensitive material for photographing can be detected easily. Therefore, the accuracy of detecting the state of the processing solution for photosensitive materials for photographing can be improved if average values of measured density values are determined per film type or if the densities of only a particular film type are measured.

In the same way as the above described densities Dfb, the densities Dpb of respective colors on an unexposed photosensitive material for printing which is immersed in and processed by a processing solution for photosensitive materials for printing at an image forming device vary in accordance with various factors as shown by following formula (3).

$$Dpb = f(P, Bp, T, Cp) \quad (3)$$

wherein:

P: type of photosensitive material for printing

Bp: lot difference of photosensitive material for printing

T: history of environment since production

Cp: state of processing solution for photosensitive materials for printing

Usually, the type P, lot difference Bp, and history since production T are already known of photosensitive materials for printing. A value expressing the state of the processing solution for photosensitive materials for printing is obtained if the densities Dpb of photosensitive materials for printing in which the above factors are constant are measured, or if the densities Dpb of many photosensitive materials for printing in which the above factors are not constant are measured and are averaged.

Therefore, in the second aspect, at an image forming device, an unexposed photosensitive material for printing is immersed into a processing solution for photosensitive materials for printing so as to be processed. The processed photosensitive material for printing is divided into a plurality of colors, the densities are measured, and the measured density values are stored. The steps of immersing, dividing and measuring, and storing are repeated periodically. The state of the processing solution for photosensitive materials for printing is determined on the basis of the stored density values. In this way, in the same way as in the first aspect, the state of the processing solution for photosensitive materials for printing can be determined without using a control strip or the like. There is no need for the work involved in storing the control strip such that fogging or the like does not occur, or in periodically setting the control strip, or the like. Therefore, the state of the processing solution for photosensitive materials for printing can be managed easily and appropriately.

Densities Dpi of respective colors of an image, which is developed on a photosensitive material for printing by exposing an original image and immersing the photosensitive material for printing in a processing solution for photosensitive materials for printing so as to process the photosensitive material for printing at an image forming device, vary in accordance with various factors as shown in following formula (4).

$$Dpi = f(Dfi, E, P, Bp, T, Cp) \quad (4)$$

wherein:

$E = E_o + E_h$

Dfi: density of each color of the original image

E: exposure conditions $E_o$: reference exposure conditions $E_h$: amount of correction of exposure conditions Generally, the relation between the density Dpi of the image on the photosensitive material for printing, the density value Dfi of the original image, and the exposure conditions E is constant. From formula (4), it can be understood that this relation varies by being effected by the factors of the type P of the photosensitive material for printing, the lot difference Bp, the history of the environment T, and the state Cp of the processing solution for photosensitive materials for printing. As mentioned previously, the type P, the lot difference Bp and the history T since production are usually known of a photosensitive material for printing. Therefore, variations in the state of the processing solution for photosensitive materials for printing can be detected by using the image densities Dpi, the densities Dfi of the image and the exposure conditions E when using a photosensitive material for printing for which these factors are constant, or by using the respective determined average values of the image densities Dpi, the densities Dfi of images and the exposure conditions E of a large number of photosensitive materials for printing for which these factors are not constant.

On the basis of the above discussion, in the third aspect, for a photosensitive material for printing, on which an original image has been exposed at predetermined exposure conditions and which has been immersed into and processed by a processing solution for photosensitive materials for printing at an image forming device, the density of an image developed on the photosensitive material for printing is divided into a plurality of colors. The densities are measured, and the measured density values of the respective colors are stored together with results of measuring density values of the original image for the respective colors and exposure conditions at the time the original image was exposed onto the photosensitive material for printing. The steps of dividing and measuring, and storing are repeated. The state of the processing solution for photosensitive materials for printing is determined on the basis of the stored density values of the image on the photosensitive material for printing, the stored density values of the original image, and the stored exposure conditions.

Here, in the same way as in the second aspect, the state of the processing solution for photosensitive materials for printing can be detected without using a control strip or the like. Further, there is no need for the work involved in storing the control strip such that fogging or the like does not occur or in periodically setting the control strip. Therefore, the state of the processing solution for photosensitive materials for printing can be managed easily and appropriately.

The first through the third aspects are respectively applicable to an image forming apparatus equipped with a function for immersing a photosensitive material for photographing into a processing solution for photosensitive materials for photographing so as to process the photosensitive material for photographing, a function for exposing an image recorded on the photosensitive material for photographing onto a photosensitive material for printing, and a function for immersing the photosensitive material for printing into a processing solution for photosensitive materials for printing so as to process the photosensitive material for printing. The state of a processing solution for photosensitive materials for photographing can be determined in accordance with the first aspect, and the state of a processing solution for photosensitive materials for printing can be determined in accordance with the second or third aspect.

However, in these types of image forming devices, the state of the processing solution for photosensitive materials for printing may be determined as in the fourth aspect as follows: a photosensitive material for photographing, on at least a portion of which a reference image has been exposed, is automatically immersed into a processing solution for photosensitive materials for photographing so as to be processed. The image reference-developed on the photosensitive material for photographing is automatically exposed onto a photosensitive material for printing at predetermined exposure conditions. The exposed photosensitive material for printing is automatically immersed into a processing solution for photosensitive materials is printing so as to be processed. The densities of the reference images developed on the photosensitive material for photographing and the photosensitive material for printing are automatically divided into a plurality of colors and the densities are measured. The measured density values of the respective reference images for the respective colors and the predetermined exposure conditions are automatically stored. The state of the processing solution for photosensitive materials for photographing is determined on the basis of the stored density values of the image on the photosensitive material for photographing. The state of the processing solution for photosensitive materials for printing is determined on the basis of the stored density values of the image on the photosensitive material for printing, the stored density values of the image on the photosensitive material for photographing, and the stored exposure conditions.

The exposing of the reference image onto the photosensitive material for photographing may be carried out during the production of the photosensitive material for photographing, or during photographing of the photosensitive material for photographing by a camera or the like, or immediately before the photosensitive material for photographing is immersed in and processed by a processing solution for photosensitive materials for photographing. Although it is necessary to expose the reference image in advance separately from the images exposed by photographing, the determination of the state of a processing solution for photosensitive materials for photographing is not effected by the photographed scenes as opposed to a case in which the state of the processing solution is determined by using the images exposed by photographing. Therefore, the state of the processing solution can be determined even more accurately.

In either the third or the fourth aspect, parameters of a determination formula for calculating the state of the processing solution for photosensitive materials for printing can be determined by using the reference exposure conditions, and the state of the processing solution for photosensitive materials for printing can be determined on the basis of the determination formula whose parameters were determined, and on the basis of density values of images on the photosensitive material for printing, and on the basis of density values of the original images or reference images on the photosensitive material for photographing, and on the basis of the exposure conditions. However, the reference exposure conditions must be corrected when factors such as the type of photosensitive material for printing, the amount of light of the exposure lamp, and the like vary. As these factors vary, the aforementioned relation between the image densities Dpi, the densities Dfi of the images, and the exposure conditions E vary.

Therefore, in the fifth aspect, each time the reference exposure conditions are corrected, if the parameters are changed by using the changed reference exposure conditions, the state of the processing solution for photosensitive materials for printing can be determined accurately regardless of variations in the reference exposure conditions.

The composition of a processing solution varies in accordance with the processed surface area of the photosensitive material and the like, and the performance of the processing solution deteriorates as the composition varies. Further, the amount of replenishing solution replenished (i.e., the sum value of replenished replenishing solution) gradually increases as time passes from the time when the processing solution is first placed in the device. As the amount of replenished replenishing solution increases, the composition of the processing solution varies. Moreover, the temperature of the processing solution is usually adjusted to a predetermined temperature. However, as the time for adjusting the temperatures becomes longer, the time over which the solution is exposed to high temperatures and reacts with the air increases, and the composition of the solution changes. Various types of variables which express the characteristics of the processing solution (e.g., specific gravity of the solution, electric conductivity of the solution, pH of the solution, and the like) may be used as indices expressing the performance (and the state) of the processing solution.

Therefore, in the determination of the state of the processing solution for photosensitive materials for photographing, as described in the sixth aspect, it is preferable that at least one of variables, which effect the composition of the processing solution and which include the surface area of the photosensitive material for photographing processed per fixed period of time by the image forming device, and variables, which express the characteristics of the processing solution for photosensitive materials for photographing, are detected, and that the state of the processing solution for photosensitive materials for photographing is determined by using the detected variables. In this way, the state of the processing solution for photosensitive materials for photographing can be determined more accurately than a case in which the state of the processing solution is determined by using only one of the densities of respective colors of the image portions developed on the photosensitive material for photographing and the densities of respective colors of the portions other than the image regions.

In the seventh aspect, in the determination of the state of the processing solution for photosensitive materials for printing, in the same way as described above, the state of the processing solution for photosensitive materials for printing can be determined more accurately if at least one of variables effecting the composition of the processing solution for photosensitive materials for printing and variables expressing the characteristics of the processing solution for photosensitive materials for printing are detected, and the state of the processing solution for photosensitive materials for printing is determined by using the detected variables. Further, the various phenomena occurring when the state of the processing solution for photosensitive materials for printing deviates from a standard state (e.g., the color balance of an image is unbalanced toward a particular color, or the like) and the correspondence with their causes can be empirically known to a certain extent.

Therefore, when it is determined that the state of a processing solution for photosensitive materials for printing has deviated from a standard state, as described in the seventh aspect, it is preferable that the cause of deviation from a standard state is analyzed on the basis of the stored information and the detected variables, and that at least one of maintaining/managing conditions of the processing solution for photosensitive materials for printing and an amount of correction of exposure conditions at a time of exposing an image onto a photosensitive material for printing is changed on the basis of the results of analysis. In this way, images of good quality can be formed on the photosensitive material for printing. It is preferable that changes in the state of the processing solution are handled by changing the maintaining/managing conditions of the processing solution. However, there are many cases in which a certain amount of time is required until the state of the processing solution returns to the standard state. In such cases, images of good quality can be formed on the photosensitive material for printing by correcting the exposure conditions.

The determination of the state of a processing solution for photosensitive materials for photographing, such as in the first aspect in particular, presupposes that even if the contents (the overall hue or density or the like) of an image exposed on a photosensitive material for photographing are random for each of the individual images, the average hue of a large number of images will be gray or a constant hue which is near gray. However, it is known that, in photographic films in particular, the overall density and color balance of photographed images vary each time the season changes (seasonal variations). Accordingly, even if the average of a large number of images is taken, the color balance will be unbalanced toward a particular color and the density wall vary each time the season changes. There is the possibility that such variations may not be able to be distinguished from variations caused by changed in the state of the processing solution.

As a result, in the eighth aspect, state data which expresses states of processing solutions of a plurality of image forming devices is periodically collected, and the states of the processing solutions of the plurality of image forming devices are determined by comparing the respective state data of the image forming devices with an average value of the state data of the plurality of image forming devices. When the image forming device is equipped with a function for immersing a photosensitive material for photographing into a processing solution for photosensitive materials for photographing so as to process the photosensitive material for photographing, the density values of the images on the photosensitive material for photographing may be used as the state data, as in the first aspect. When the image forming device is equipped with a function for immersing a photosensitive material for printing into a processing solution for photosensitive materials for printing so as to process the photosensitive material for printing, the density values of the unexposed photosensitive material for printing may be used as the state data as in the second aspect, or the density values of the images on the photosensitive material for printing, the density values of the original image, and the exposure conditions may be used as the state data as in the third aspect. Further, as in the sixth and seventh aspects, variables effecting the composition of the processing solution or variables expressing the characteristics of the processing solution may be used at the same time.

In a case in which state data of a plurality of image forming devices are used, as overall hue and density of a plurality of images vary due to seasonal variations, the state data of each of the plurality of image forming devices change in the same way. Accordingly, it is possible to detect only changes in the states of the processing solutions of the image forming devices by comparing the state data of the individual image forming devices with an average value of respective state data of a plurality of image forming devices. Therefore, the respective states of processing solutions of a plurality of image forming devices can be determined accurately.

In the ninth aspect, the following data are received: density values for each color of an image developed on a photosensitive material for printing by exposing an original image onto the photosensitive material for printing and by immersing and processing the photosensitive material for printing in a processing solution for photosensitive materials for printing at each of the plurality of image forming devices, and density values for each color of the original image at each of the plurality of image forming devices, and exposure conditions at the time when the original image is exposed onto the photosensitive material for printing at each of the plurality of image forming devices. Amounts of correction of the exposure conditions are calculated at the calculating means on the basis of values obtained by statistically processing the received densities of images on the photosensitive materials for printing, the received densities of the original images, and the received exposure conditions, for example, on the basis of average values or weighted average values. The correcting means corrects the exposure conditions at the time of exposing images onto photosensitive materials for printing at each of the image forming devices, by the calculated amounts of correction.

An example of correction of the exposure conditions is as follows. On the basis of the relation between the average value of the image densities on the photosensitive material for printing, the average value of the original image densities and the average value of the exposure conditions, and on the basis of the difference between the average value of the image densities on the photosensitive material for printing and a reference density determined in advance, an amount of rectification for rectifying the average value of the exposure conditions is calculated and the amount of rectification is used as the amount of correction for the reference exposure conditions, so that an image of the reference density value is obtained on the photosensitive material for printing from an image whose density matches the average density of the original image densities.

In accordance with the above description, for example, for original images recorded on photosensitive materials for photographing whose coloring conditions are unknown, if a small number of such images are processed at a plurality of image forming devices, the original image densities or the like are accumulated for each type of photosensitive material for photographing by using the DX codes or the like. The difference in the coloring characteristics per type of photosensitive material for photographing is expressed by the difference in the average value of the densities of each color of the original images calculated per type of the photosensitive material for photographing. Correction amounts of the exposure conditions are calculated such that the original images recorded on photosensitive materials for photographing of different types are exposed on photosensitive materials for printing as images of respectively appropriate densities. Accordingly, the exposure conditions for each of the plurality of image forming devices can be corrected appropriately regardless of the types of photosensitive materials for photographing.

In the tenth aspect, density values for each color of images developed on processed photosensitive materials and at least one of variables effecting the composition of the processing solution and variables expressing the characteristics of the processing solution, which variables and density values are detected at each of the plurality of image forming devices, are received. The determining means compares the received information and determines the state of the processing solution of each image forming device. If there is an image forming device for which it is determined that the state of the processing solution differs from the standard state, the analyzing means analyzes the causes of the deviation from the standard state, based on the received information. On the basis of the results of analysis, the calculating means determines at least one of maintaining conditions of the processing solution and an amount of correction of the exposure conditions.

In accordance with the above description, in the seventh aspect, the respective states of the processing solutions at a plurality of image forming devices can be determined accurately, and images of good quality can be formed on the photosensitive material at each of the image forming devices. Further, in the tenth aspect, because many information are received from the plurality of image forming devices, on the basis of the received information, the correlation between, on the one hand, the densities of each color of the images on the photosensitive materials, and on the other hand, various variables effecting the composition of the processing solution and various variables expressing the characteristics of the processing solution, is determined by a statistical analysis method such as regression analysis or the like. The causes of the deviation of the state of the processing solution from the standard state can also be analyzed accurately by using the correlation. Moreover, the maintaining conditions of the processing solution or the amount of correction of the exposure conditions, which the calculating means determines from the results of analysis, may be sent to the individual image forming devices via a communicating means or the like.

In the eleventh aspect, in the first or the fourth aspect, the type of the photosensitive material for photographing is detected. Measured density values are stored per type of photosensitive material for photographing, or the densities of only a particular type of photosensitive material for photographing are measured and stored. The state of the processing solution for photosensitive materials for photographing is determined by using the density values of the same type of photosensitive material for photographing.

In accordance with the eleventh aspect, errors, which are included in the density values of each color of the images (the densities Dfi in formula (1)) and which are caused by differences in types of photosensitive materials for photographing, can be eliminated. Therefore, the state of the processing solution can be determined more precisely.

In the twelfth aspect, in the first aspect, the photosensitive material for photographing is a photographic film. The density of the portion of the photographic film other than the images is measured. Photographic films, whose measured density values are less than or equal to a predetermined value and for which the number of data is less than or equal to a predetermined number, are excluded from use in the determination of the state of the processing solution. (This corresponds to step 336 of FIG. 2B which will be explained later.)

In accordance with the twelfth aspect, erroneous determination of the state of the processing solution due to use of the densities of a photographic film in which fogging or the like has occurred due to problems in a camera or the like can be prevented.

In the thirteenth aspect, in the seventh aspect, the analysis of causes of deviation when it is determined that the state of the processing solution for photosensitive materials for printing has deviated from a standard state is carried out in accordance with the type of the processing solution for photosensitive materials for printing.

With regard to the cause of the deviation of the state of the processing solution for photosensitive materials for printing from the standard state, the determination as to what phenomenon has occurred is carried out in accordance with the type of the processing solution for photosensitive materials for printing. Accordingly, because the analysis of the cause is carried out in accordance with the type of the processing solution for photosensitive materials for printing, it is possible to accurately analyze the cause of the deviation.

In the fourteenth aspect, in the ninth aspect, each of the plurality of image forming devices is provided with a detecting means for detecting the type of a photosensitive material for photographing on which original images are recorded. The receiving means also receives the types of the photosensitive materials for photographing on which the exposed original images are recorded. The calculating means calculates an amount of correction of the exposure conditions for each type of photosensitive material for photographing.

BRIEF DESCRIPTION OF THE DRAWINGS

FIG. 1 is a schematic structural view of a film processor relating to a first embodiment.

FIG. 10A is a graph illustrating variations in a low density, contrast and stain for each of R, G, B when the developing time by a color developing solution varies.

FIG. 10B is a graph illustrating variations in low density, contrast and stain for each of R, G, B when the temperature of the color developing solution varies.

FIG. 11A is a graph illustrating variations in low density, contrast and stain for each of R, G, B when the pH of the color developing solution varies.

FIG. 11B is a graph illustrating variations in low density, contrast and stain for each of R, G, B when the strength of mixing the color developing solution varies.

FIG. 12A is a graph illustrating variations in low density, contrast and stain for each of R, G, B when the amount of replenishing solution replenished to the color developing solution varies.

FIG. 12B is a graph illustrating variations in low density, contrast and stain for each of R, G, B when the proportion of bleaching/fixing solution mixed in with the color developing solution varies.

FIG. 13A is a graph illustrating variations in low density, contrast and stain for each of R, G, B when the concentration of $Fe^{2+}$ mixed in the color developing solution varies.

FIG. 13B is a graph illustrating variations in low density, contrast and stain for each of R, G, B when the concentration of $Ca^{2+}$ and $Mg^{2+}$ mixed in the color developing solution varies.

FIG. 13C is a graph illustrating variations in low density, contrast, and stain for each of R, G, B when the concentration of $Cu^{2+}$ mixed in the color developing solution varies.

FIG. 16 is a schematic view illustrating a processing solution state managing system relating to a fourth embodiment.

DESCRIPTION OF THE EMBODIMENTS

Figure 2A:
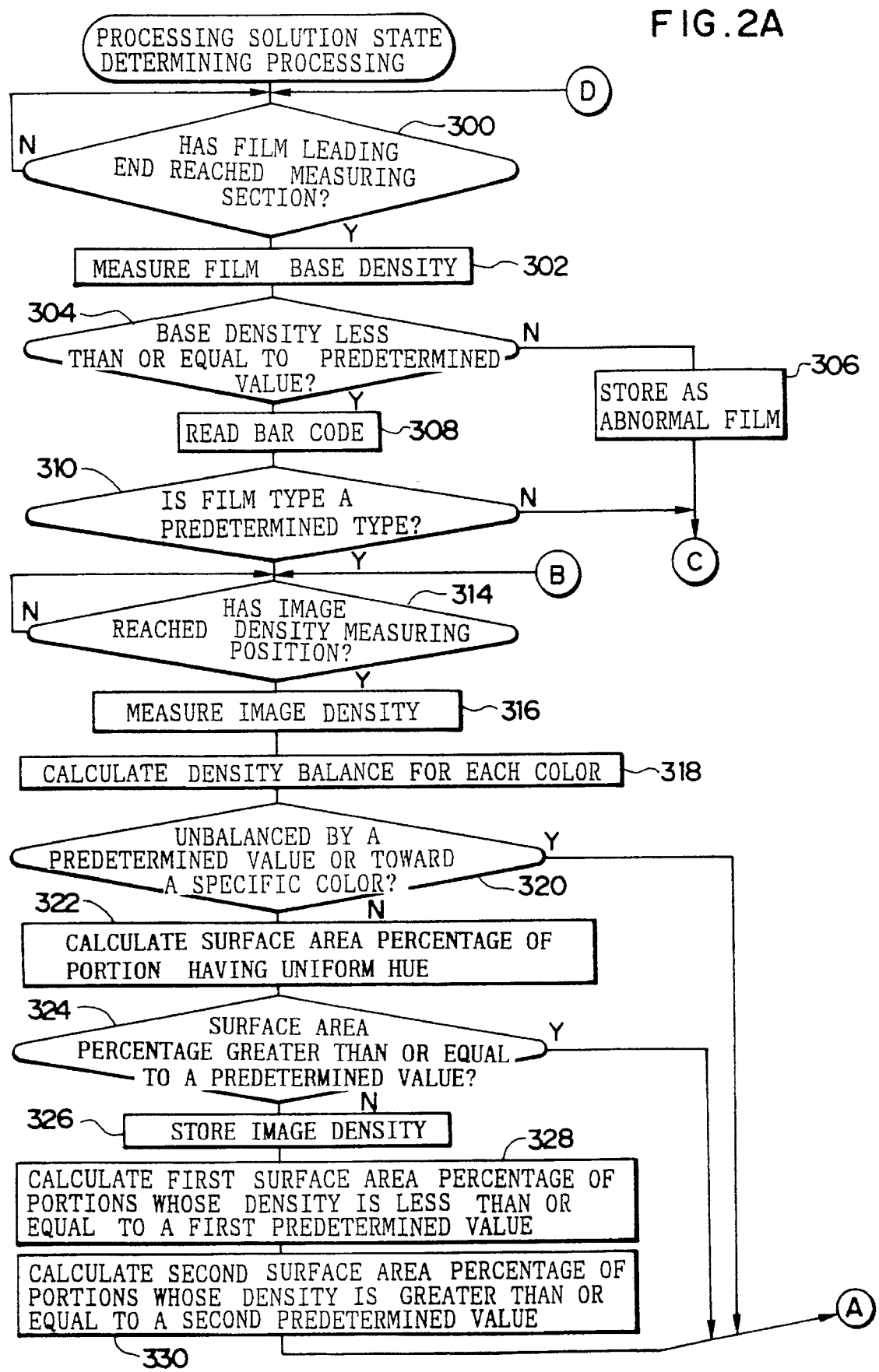
FIGS. 2A and 2B are flowcharts explaining processing solution state determining processing relating to the first embodiment.

Hereinafter, the embodiments of the present invention will be described in detail with reference to the drawings.

[First Embodiment]

FIG. 1 illustrates a film processor 10 serving as an image forming device relating to the present invention. The film processor 10 includes a film loading section 12. The film loading section 12 is revealed by opening an unillustrated cover, and an exposed negative film 14, which was used for photographing and on which images are exposed and which serves as a photosensitive material for photographing, is loaded into the film loading section 12.

The negative film 14 loaded into the film loading section 12 is conveyed into a processor section 22. Processing tanks, which are a developing tank 24, a bleaching tank 26, a bleaching/fixing tank 28, a fixing tank 30, rinse tanks 32, 34, and a stabilizing tank 36, are disposed in order in the processor section 22. Developing solution, bleaching solution, bleaching/fixing solution, fixing solution, rinsing solution, and stabilizing solution are stored in the processing tanks, respectively. A crossover rack 38 is disposed above the respective processing tanks. The crossover rack 38 has rollers 42 corresponding to partitioning plates 40 which partition the respective processing tanks. The rollers 42 form a transfer/conveying path between the respective processing tanks. Be entraining the negative film 14 about the rollers 42, the negative film 14 is transferred between processing tanks, and is immersed into the respective processing solutions so as to undergo processing.

A drying section 44 is disposed adjacent to the processor section 22. A roller 46 is disposed within the drying section 44. The negative film 14 which has been discharged from the processor section 22 is guided into the drying section 44, is entrained about the roller 46, and is subject to drying processing. Thereafter, the negative film 14 is conveyed to a density measuring section 48 which is adjacent to the drying section 44.

An optical system 50, which includes a light source and C, M, Y filters, and a densitometer 52, which divides the image recorded on the negative film 14 into a plurality of regions and measures the density of each divisional region, are disposed in the density measuring section 48 so as to oppose each other with the conveying path of the negative film 14 being located therebetween. An image has been developed on the negative film 14 by the series of processes in the processor section 22. The density of this image, is by the optical system 50 and the densitometer 52, divided into a plurality of densities and divided into three colors of R, G, B , and the respective densities are measured. Further, the density of the portion of the negative film 14 outside of the image region is also divided into the three colors and measured by the optical system 50 and the densitometer 52. The optical system 50 and the densitometer 52 are connected to a control device 54, and output the results of measurement to the control device 54.

A bar code reader 56 is provided in the density measuring section 48. The bar code reader 56 reads a bar code which is recorded on the side portion of the negative film 14 and which expresses a DX code or the like. The bar code reader 56 is connected to the control device 54, and outputs the information expressed by the read bar code to the control device 54. The control device 54 is equipped with a non-volatile memory 54A such as a back-up RAM or the like. A display 18, such as a liquid crystal or the like, for displaying various types of information, and a keyboard 20 for inputting various types of data, commands, and the like are connected to the control device 54. The negative film 14 which has passed through the density measuring section 48 is discharged to the exterior of the film processor 10 by a film stocker 58.

Figure 2B:
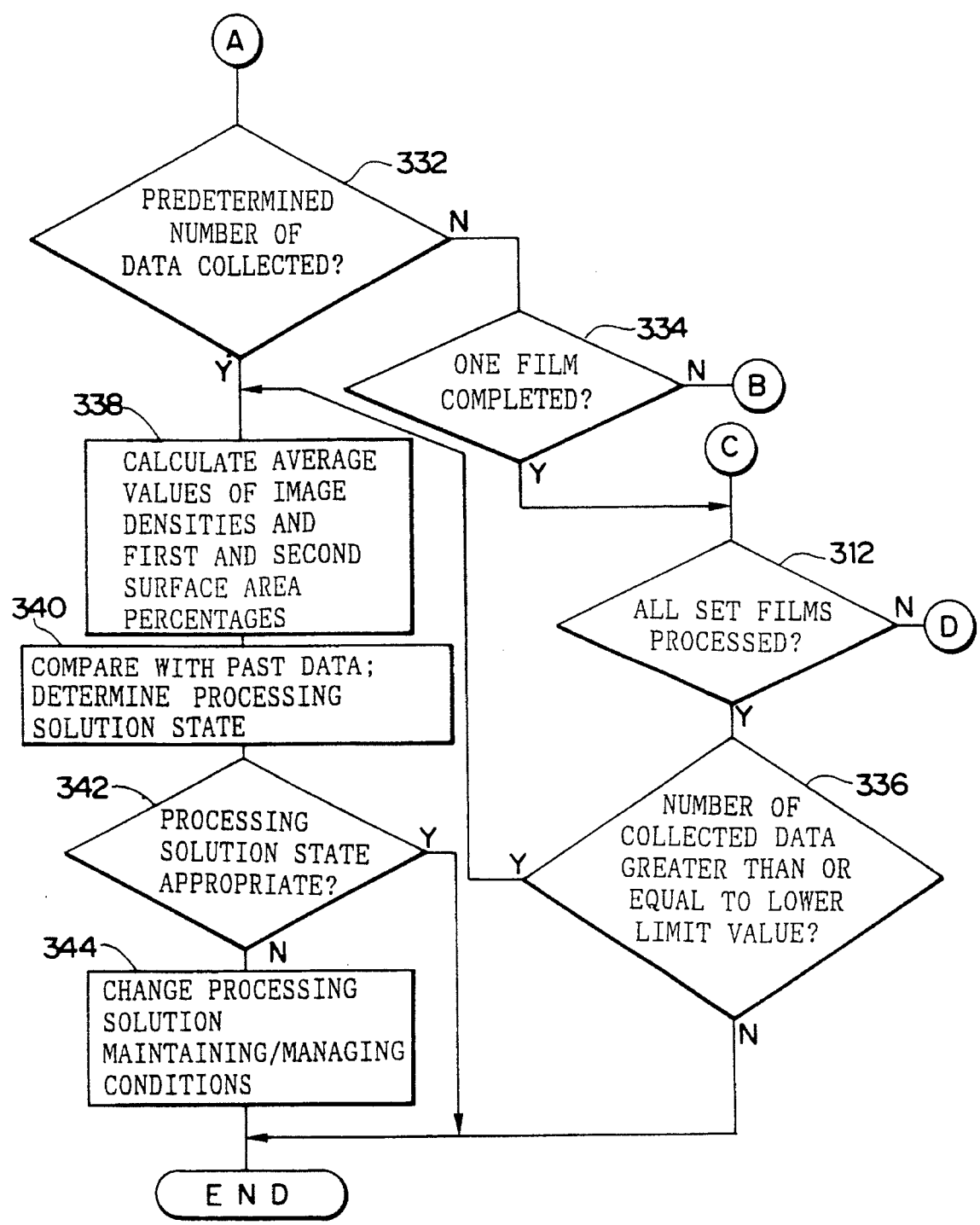

Next, operation of the first preferred embodiment will be described with reference to the flowchart in FIGS. 2A and 2B. The processing solution state determining processing illustrated in FIGS. 2A and 2B is executed each time an approximately fixed period of time passes. If a predetermined period of time passes from the previous time the processing solution state determining processing was carried out and processing of the negative film 14 begins at the film processor 10, the routing in FIGS. 2A and 2B is implemented in an interrupt action. While the processing solution state determining processing is being carried out, processing of a photographed negative film 14, for which developing has been requested by the user, continues to be carried out at the film processor 10.

In step 300, a determination is made as to whether the leading end of the negative film 14, which has been dried after being immersed in and processed by the processing solutions, has reached the density measuring section 48. The process stands-by until the answer to the determination in step 300 is "Yes". When the answer to the determination in step 300 is "Yes", in step 302, the density of the unexposed portion (film base portion) of the leading end portion of the negative film 14 is measured by the optical system 50 and the densitometer 52. In step 304, a determination is made as to whether the measured base density is less than or equal to a predetermined value. If the base density is greater than the predetermined value, it may be assumed that fogging has occurred in the negative film 14 due to an abnormality or the like in the camera which exposed the images onto the negative film 14. Therefore, when the answer to the determination in step 304 is "No", in step 306, the negative film 14 is stored in the memory 54A as an abnormal film, and the process proceeds to step 312.

When the answer to the determination in step 304 is "Yes", in step 308, the bar code of the negative film 14 is read by the bar code reader 56. In subsequent step 310, on the basis of the read bar code information, a determination is made as to whether the film type of the negative film 14, whose leading end has presently reached the density measuring section 48, is a predetermined film type which is selected in advance. If the answer to the determination in step 301 is "No", the process moves to step 312. In step 312, a determination is made as to whether processing has been carried out for all of the negative films 14 set at the film processor 10. If the answer to the determination in step 312 is "No", the process returns to step 300, and the above-described processing is repeated.

On the other hand, when the answer to the determination in step 301 is "Yes", in step 314, a determination is made as to whether an image of the negative film 14 has reached the density measuring position (the location at which the densitometer 52 is disposed). The process stands-by until the answer to the determination in step 314 is "Yes". When the image has reached the density measuring position, in subsequent step 316, the density of the image is divided into a plurality of densities which are divided into three colors and measured, by the optical system 50 and the densitometer 52. In step 318, a three-color density balance for the image is calculated on the basis of the results of measurement. In subsequent step 320, a determination is made as to whether the calculated density balance is unbalanced by a predetermined amount or more toward a specific color.

If the answer to the determination in step 320 is "No", in step 322, the percentage of the surface area of the entire image which is occupied by a portion, which has a uniform hue and whose surface area is relatively large, is calculated. In step 324, a determination is made as to whether the calculated surface area percentage is greater than or equal to a predetermined value. If the answer to the determination in step 320 or in step 324 is "Yes", it can be determined that the image whose density was measured is an image in which color failure has occurred. It is not preferable to use the density data of this image in determining the state of the processing solution. Therefore, when the answer to the determination in either step 320 or step 324 is "Yes", the process proceeds to step 332 without the density data being stored or the like.

If the answer to the determination in step 324 is "No", the image density measured previously in step 316 is stored in the memory 54A in step 326. In step 328, the percentage of the surface area of portions of the image whose density is less than or equal to a first predetermined value (the first surface area percentage) is calculated. In step 330, the percentage of the surface area of portions of the image whose density is greater than or equal to a second predetermined value (the second surface area percentage) is calculated. The process proceeds to step 332. In step 332, a determination is made as to whether a predetermined number of data (the image density, the first surface area percentage, the second surface area percentage) have been collected (stored). If the answer to the determination in step 332 is "No", the process proceeds to step 334, where a determination is made as to whether processing has been completed for one film which was determined in step 310 to be a predetermined film type selected in advance.

When the answer to the determination in step 334 is "No", the process returns to step 314. Steps 314 through 334 are repeated until the determination in either step 332 or step 334 is "Yes". When the predetermined number of data have been collected, the answer to the determination in step 332 is "Yes", and the process proceeds to step 338. When processing for one film is completed before the predetermined number of data are collected, the answer to the determination in step 334 is "Yes", and the process moves to step 312. If processing has not been carried out for all of the negative films 14 set at the film processor 10, the process returns to step 300.

When the answer to the determination in step 312 is "Yes", in step 336, a determination is made as to whether the number of data collected is greater than or equal to the predetermined lower limit value of the number of collected data. When the answer to the determination in step 336 is "No", the processing solution state determining processing is ended without determining the state of the processing solution or the like because there is the possibility that the state of the processing solution will be determined incorrectly if only a small number of collected data are used. Further, when the answer to the determination in step 336 is "Yes", the process proceeds to step 338.

In step 338, the respective average values of the collected data of the image densities, the first surface area percentages and the second surface area percentages are calculated, and the results of calculation are stored in the memory 54A. In subsequent step 340, these results of calculation are compared with the average values of the image densities, the average values of the first surface area percentages, and the average values of the second surface area percentages which were calculated in processing solution state determination processings executed in the past and which are stored in the memory 54A, and the change in the state of the processing solution is determined.

Figure 3:
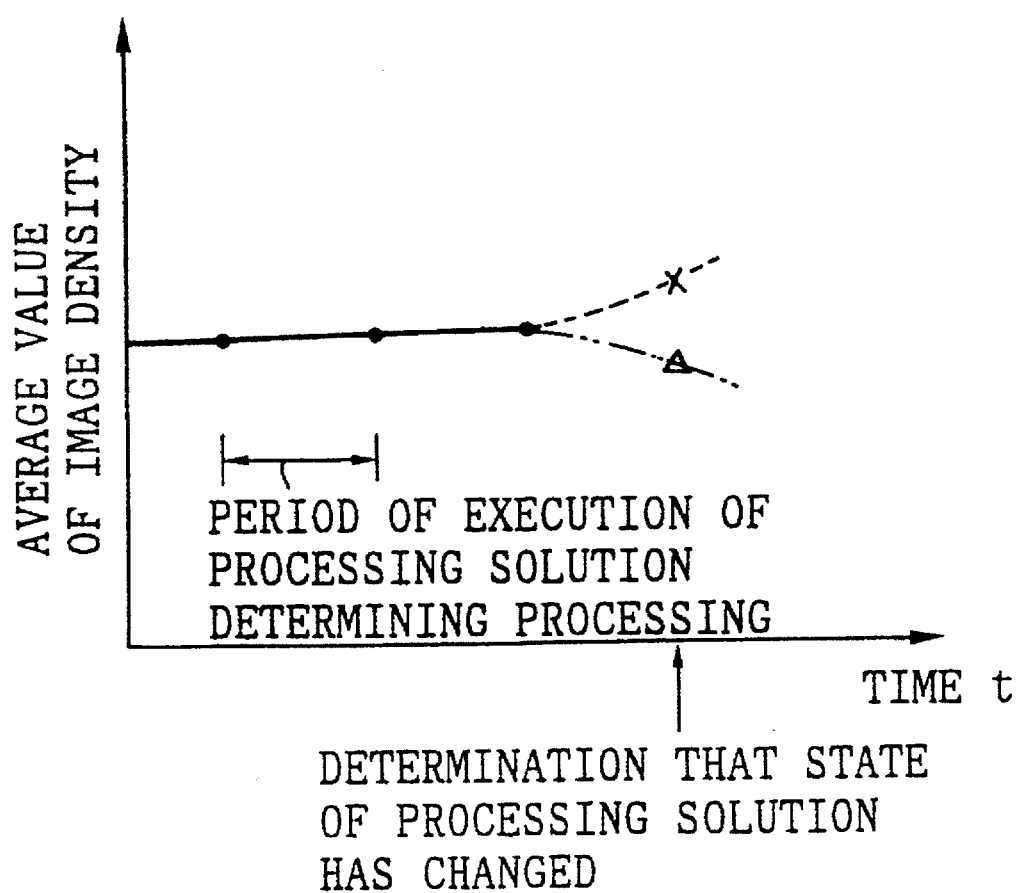
FIG. 3 is a graph illustrating the change in the average value of image densities, for explaining the example of determining a processing solution state in the first embodiment.

For example, the average values of image densities determined in the past have progressed as illustrated by the solid line in FIG. 3. If the average value of the image densities determined this time is the value denoted by the "x" in FIG. 3, it can be determined that the average value of the image densities is changing in the direction of increasing as illustrated by the broken line in FIG. 3, and that the state of the processing solution has changed. Further, if the average value of the image densities determined this time is the value denoted by Δ in FIG. 3, it can be determined that the average value of the image densities is changing in the direction of decreasing as illustrated by the imaginary line in FIG. 3, and that, in this case as well, the state of the processing solution has changed.

With regard to the first surface area percentage and the second surface area percentage, in a case in which the first surface area percentage has decreased as compared with the past average values, it can be determined, as a specific state of the processing solution, that the degree of activity of the color developing solution has decreased. Further, in a case in which the second surface area percentage has increased as compared with the past average values, it can be determined that the overall image density has increased, and that, as a specific state of the processing solution, unsatisfactory desilverization has occurred or the temperature of the color developing solution has risen or the like.

In subsequent step 342, a determination is made as to whether the state of the processing solution was determined to be appropriate in step 340. When the answer to the determination in step 342 is "Yes", processing ends. When the answer is "No", in step 344, the parameters corresponding to the maintaining/managing conditions of the processing solution are automatically changed (e.g., the amount of replenishing solution replenished per unit time, the target value of the temperature of the processing solution, or the like), and processing ends. In a case in which the change in the state of the processing solution cannot be corrected sufficiently merely by changing the maintaining/managing conditions, it is necessary to change the processing solution or the like. By displaying a message on the display 18 stating that the processing solution needs to be changed, or the like, the operator is urged to change the processing solution.

In this way, in the first preferred embodiment, the state of the processing solution is determined automatically and the processing solution maintaining/managing conditions are automatically changed without using a special film for condition management such as a control strip or the like. Therefore, there is no need for the work involved in storing the control strip such that fogging or the like does not occur or in setting the control strip periodically at the film processor, and the state of the processing solution can be managed easily.

Further, only images which are recorded on films of the same film type, and for which the deviation of each color from the density balance is small, and for which the percentage of surface area of the deviating color is less than or equal to a predetermined value, are sued as the images used for the calculation of the average value of the image densities. Therefore, adverse effects caused by using data of images recorded on films having different film characteristics or data of images in which color failure has occurred can be excluded, and the state of the processing solution can be determined appropriately.

By observing the average values of the first surface area percentages and the second surface area percentages of the image, unsatisfactory desilverization and changes in the degree of activity and temperature of the color developing solution can be detected. Further, because films whose base densities are greater than the predetermined value are stored as abnormal films, analysis of causes in a case in which the quality of the image on the negative film 14 processed at the film processor 10 is unsatisfactory is facilitated.

In the above explanation, the average value of the image densities of the negative film 14, the average value of the first surface area percentages, and the average value of the second surface area percentages are observed, and the state of the processing solution is determined. However, the present invention is not limited to the same, and the state of the processing solution may be determined by observing variations in the average density of the portion of the negative film 14 outside of the image region (the film base portion). In this case as well, in the same way as in the above-described embodiment, adverse effects caused by fogging and the like can be avoided if only data in which the base density is less than or equal to a predetermined value is used as the data.

In the above explanation, the density is measured and the first surface area percentage and the second surface area percentage are calculated only for negative films 14 of a predetermined film type. However, the first surface area percentage and the second surface area percentage may be calculated for the images of all negative films 14 processed by the film processor 10.

Further, in the above description, the processing solution state determining processing illustrated in FIGS. 2A and 2B is executed approximately each time a predetermined period of time passes. However, the present invention is not limited to the same, and the processing may be executed each time a predetermined number of negative films 14 are processed. Moreover, in the above explanation, the densities of the images recorded on the negative film 14 are measured selectively, and after the measured densities are successively stored, the average value of the stored densities is calculated. However, the state of the processing solution may be determined as follows: the densities of all of the images are measured and stored. The density values to be used in determining the state of the processing solution are selected from the stored density values. The average value is calculated, and the state of the processing solution is determined. In this case, the stored density values can be used in the calculation of the exposure conditions in exposure processing which is carried out later, or the like.

In the above explanation, the image densities are measured by the densitometer 52 provided in the density measuring section 48 of the film processor 10 exclusively for measuring the image densities, and the sate of the processing solution is determined by using the measured densities. However, the present invention is not limited to the same. The state of the processing solution may be determined by using density values measured by a sensor which is provided to determine exposure conditions and which is provided in a printer which exposes the images of the negative film 14 onto a photographic printing paper in later stages in the film processor 10. Further, the image densities may be obtained by signal output from a sensor for displaying the images of the negative film 14 on a monitor such as a liquid crystal or the like, or from an image reading sensor for converting the image into digital information, or the like.

[Second Embodiment]

Figure 4:
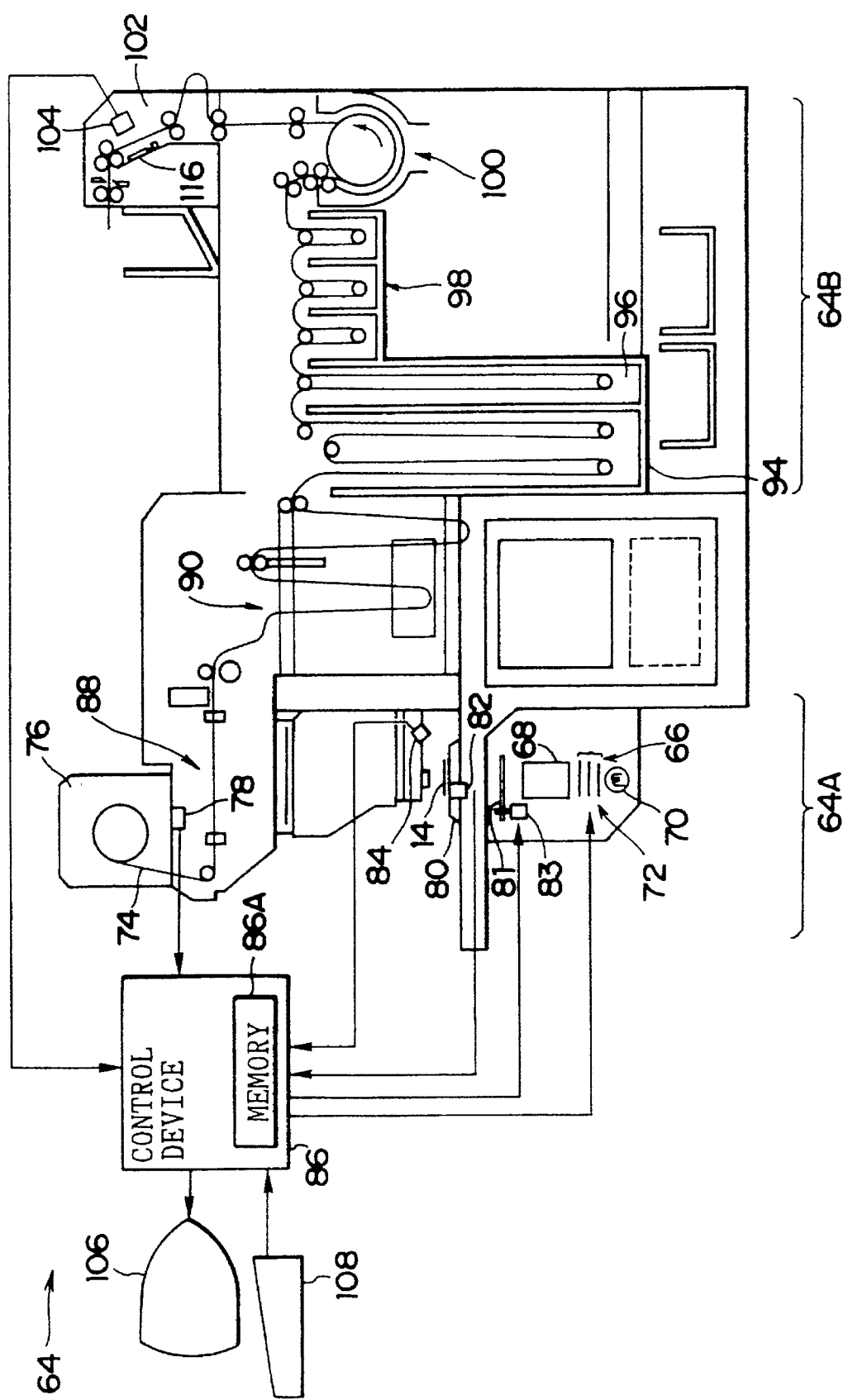
FIG. 4 is a schematic structural view of a printer processor relating to a second embodiment.

A second embodiment of the present invention will now be described. A printer processor 64 which serves as an image forming device relating to the present invention is illustrated in FIG. 4. The printer processor 64 includes a printer section 64A and a processor section 64B. A light source portion 72, which includes a light-adjusting filter portion 66 formed from C, M, Y filters, a light diffusing box 68, and a halogen lamp 70, is disposed in the printer section 64A.

A paper magazine 76, in which a photographic printing paper 74 is accommodated, is set in the printer section 64A. Information, such as the type of the photographic printing paper accommodated therein, the lot notation and the like, is recorded as marks on the outer surface of the paper magazine 76. A reading sensor 78 for reading the marks recorded on the set paper magazine 76 is provided in the printer processor 64. The reading sensor 78 is connected to a control device 86.

A negative carrier 80 and a photometer 84 are disposed in a vicinity of the exposure position of the printer section 64A. The negative film 14, which was subject to developing processing at the above-described film processor or the like, is set at the negative carrier 80. The photometer 84 is formed by a two-dimensional image sensor or the like, and divides the image of the negative film 14 positioned at the exposure position into a plurality of regions, and divides each region into three colors, and measures the three colors. A bar code reader 82, which reads a bar code recorded on the negative film 14 set at the negative carrier 80, is provided at the negative carrier 80. The bar code reader 82 and the photometer 84 are connected to the control circuit 86.

A plate 81 is disposed between the negative carrier 80 and the light diffusing box 68. A reference negative film, on which a plurality of reference images are recorded in advance at respectively different exposure levels, is set in advance on the plate 81. The plate 81 is moved by a driving device 83 to a position at which it is inserted on the exposure optical path or to a position at which it is withdrawn from the exposure optical path. The driving device 83 is connected to the control device 86, and the operation of the driving device 83 is controlled by the control device 86. At an exposure section 88 of the printer section 64A, the images on the negative film 14 are printed onto the photographic printing paper 74 pulled out from the paper magazine 76. The photographic printing paper 74 is supplied to a color developing section 94 of the processor section 64B via a reservoir portion 90 provided between the printer section 64A and the processor section 64B.

Figure 5:
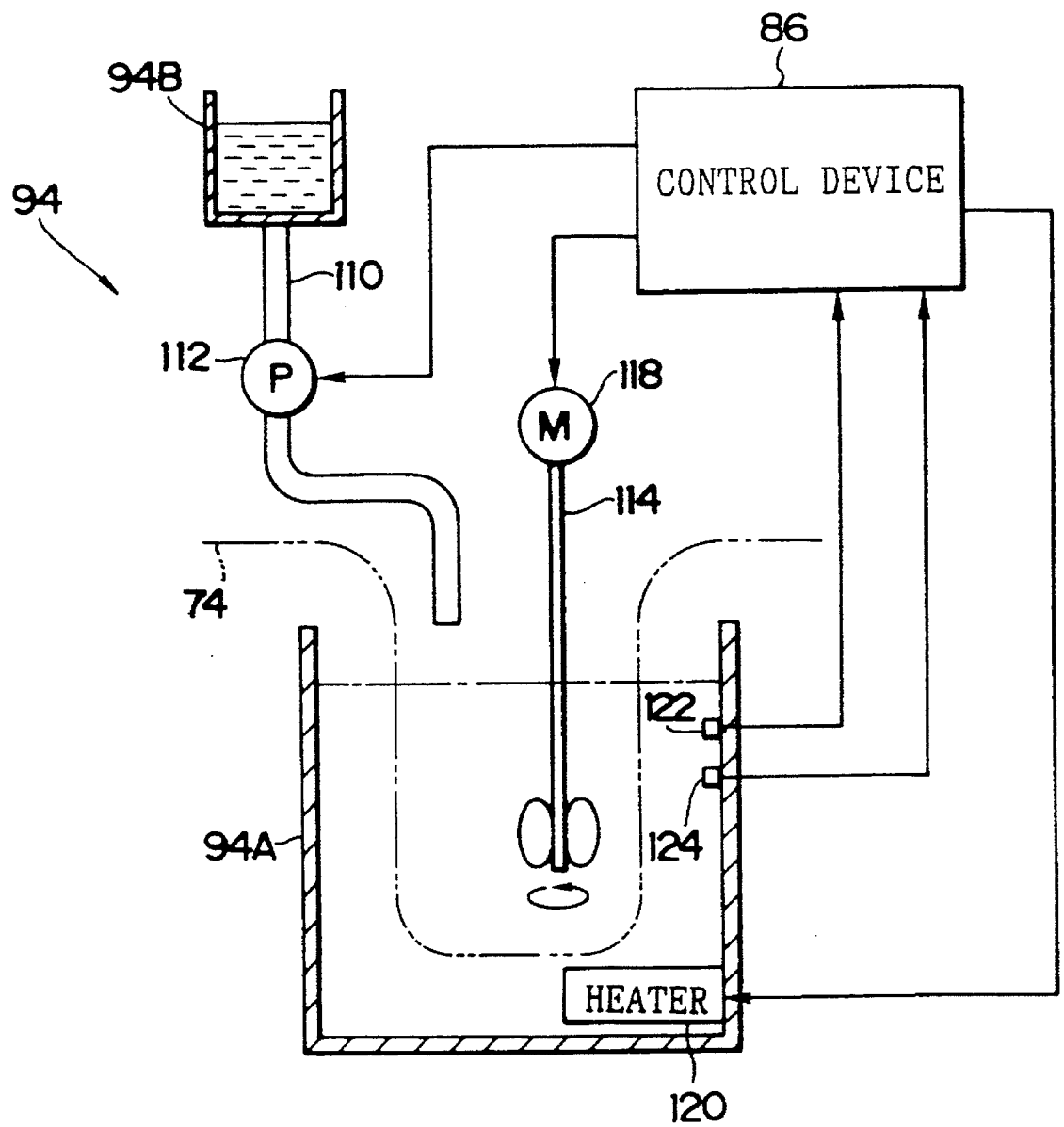
FIG. 5 is a schematic structural view of a color developing section.

As illustrated in FIG. 5, the color developing section 94 includes a developing tank 94A and a replenishing tank 94B. Color developing solution is stored in the developing tank 94A, and replenishing solution is stored in the replenishing tank 94B. The photographic printing paper 74 is developed by being immersed in the color developing solution in the developing tank 94A. One end of a conduit 110 is connected to the bottom portion of the replenishing tank 94B, whereas the other end of the conduit 110 extends to a region above the developing tank 94A. A pump 112, which is connected to the control device 86 and whose operation is controlled by the control device 86, is disposed at an intermediate portion of the conduit 110. When the pump 112 is operated, replenishing solution within the replenishing tank 94B is supplied to the developing tank 94A in an amount proportional to the time over which the pump 112 is operated. Each time the control device 86 operates the pump 112, the amount of replenishing solution replenished to the developing tank 94A is calculated on the basis of the operating time of the pump 112. The calculated replenished amounts are successively summed.

A mixer 114 is provided in the developing tank 94A so as to be submerged in the color developing solution. The mixer 114 is connected to a motor 118. By operating the motor 118, the mixer 114 rotates and mixes the color developing solution. The motor 118 is connected to the control device 86, and the operation of the motor 118 is controlled by the control device 86. A heater 120, a temperature sensor 122, and a pH sensor 124 are disposed within the developing tank 94A, and are respectively connected to the control device 86. Operation of the heater 120 is controlled by the control device 86. The temperature sensor 122 and the pH sensor 124 detect the temperature and the pH of the color developing solution, respectively, and output the results of detection to the control device 86.

The photographic printing paper 74 which is developed in the color developing section 94 is immersed in the bleaching/fixing solution in a bleaching/fixing section 96 so as to undergo bleaching/fixing processing. Thereafter, the photographic printing paper 74 is immersed in washing water in the rinse section 98 so as to be rinsed, and color prints are formed. Parallel with the processing in the processor section 64B, the control device 86 calculates the processed surface area of the photographic printing paper (processed surface area) on the basis of the width and length of the photographic printing paper 74 processed in the processor section 64B, which width and length are detected by an unillustrated sensor, and successively sums the calculated processed surface areas.

After the rinsed color prints have been subjected to drying processing in a drying section 100, the color prints are cut at a cutter section 102 into image frame units. A densitometer 104 is disposed in the cutter section 102. A reference density plate 116 is disposed so as to oppose the densitometer 104 at the opposite side of the densitometer 104 with the conveying path of the photographic printing paper 74 disposed therebetween. The densitometer 104 is connected to the control device 86. When no photographic printing paper 74 is being processed, measurement of the density of the reference density plate 116 is carried out each time a predetermined period of time elapses. The control device 86 observes the changes in the density value of the reference density plate 116 outputted from the densitometer 104 each time the predetermined period of time elapses, and calculates a correction value for correcting the density value of the reference density plate 116 outputted from the densitometer 104 to a fixed value. During condition management which will be described later, the density value outputted from the densitometer 104 is used for condition management after being corrected by this correction value.

The control device 86 is equipped with a non-volatile memory 86A such as a back-up RAM or the like. A display 106 such as a liquid crystal for displaying data or the like, and a keyboard 108 for inputting data and the like are connected to the control device 86.

Figure 6:
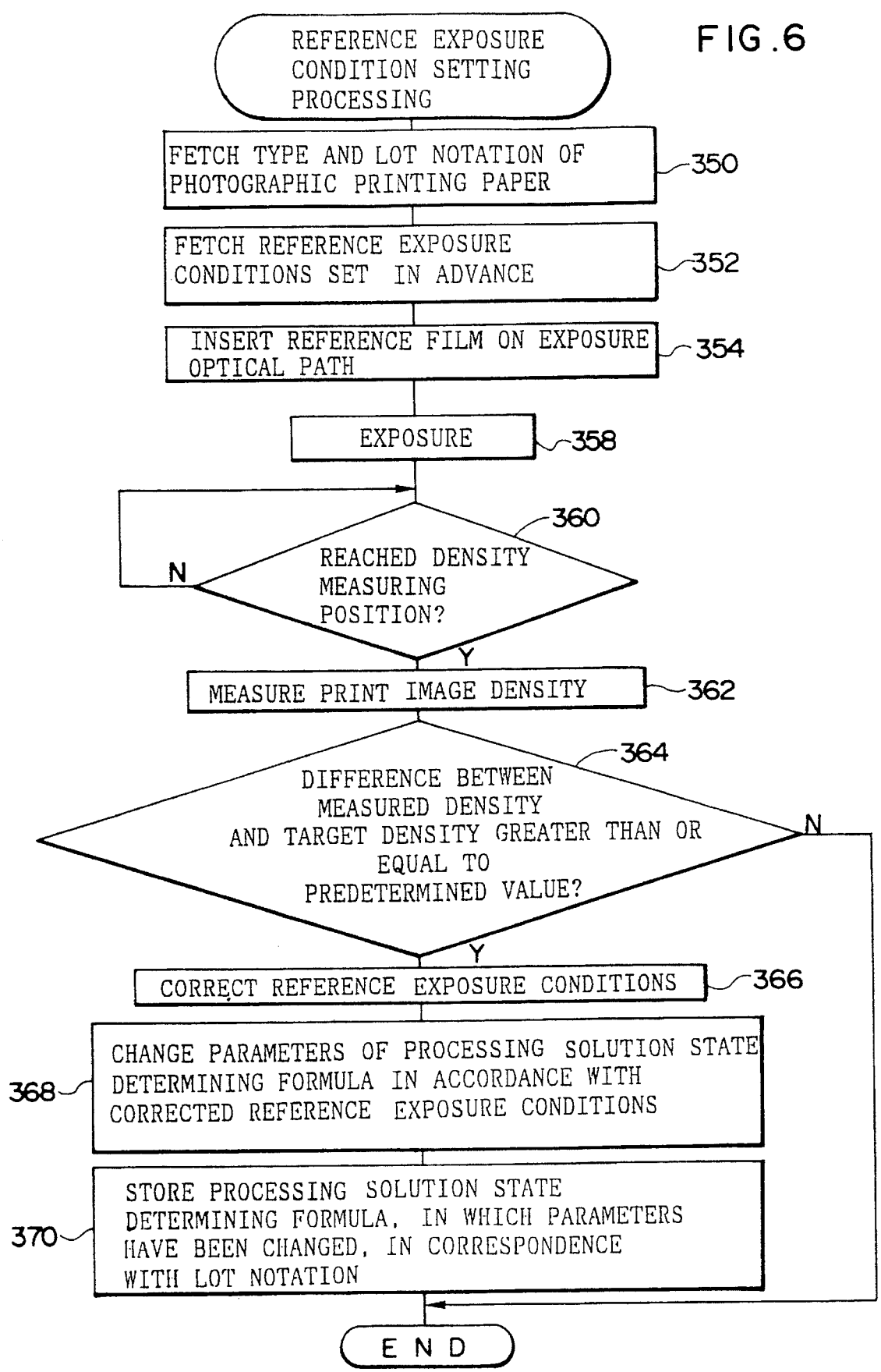
FIG. 6 is a flowchart for explaining reference exposure condition setting processing relating to the second embodiment.

As operation of the second preferred embodiment, first, reference exposure condition setting processing will be described with reference to the flowchart in FIG. 6. The reference exposure conditions are set once when the printer processor 64 is installed. However, it is necessary to correct the reference exposure conditions in cases in which, for example, a photographic printing paper 74 of a different paper type or lot is set at the printer processor 64, or the amount of light of the halogen lamp 70 changes, or the processing solutions including the color developing solution are changed, or the like. The reference exposure condition setting processing illustrated in FIG. 6 is executed after the states of the respective processing solutions in the processor section 64B have been adjusted to standard states.

In step 350, marks recorded on the paper magazine 76 and expressing the paper type and lot notation of the photographic printing paper 74 are read by the read sensor 78, and the read paper type and lot notation of the photographic printing paper 74 are fetched. In step 352, the reference exposure conditions set in advance are fetched. In step 354, the plate 81 moves to the position at which it is inserted on the exposure optical path, and the driving device 83 drives the plate 81 such that one of the plurality of images on the reference negative film set at the plate 81 is positioned on the exposure optical path. Then, in step 358, the image of the reference negative film is exposed at the fetched reference exposure conditions onto the photographic printing paper 74 pulled out from the paper magazine 76. Because a plurality of images are recorded on the reference negative film, each image is successively positioned on the exposure optical path, and exposure thereof is carried out successively.

The photographic printing paper 74, on which the images of the reference negative film have been exposed, is at the processor section 64B immersed in the respective processing solutions so as to be processed, and thereafter, is dried. In this way, the images are developed on the photographic printing paper 74. In subsequent step 360, a determination is made as to whether the images developed on the photographic printing paper 74 (hereinafter referred to as "print images") have reached the density measuring position of the densitometer 104. When the answer to the determination in step 360 is "Yes", in step 362, the densities of the plurality of print images (reference images) are respectively measured by the densitometer 104. In the next step 364, a determination is made as to whether the difference between the measured density and a target density value determined in advance is greater than or equal to a predetermined value, i.e., a determination is made as to whether the reference exposure conditions should be corrected.

When the answer to the determination in step 364 is "No", processing is ended without carrying out correction of the reference exposure conditions or the like. When the answer is "Yes", in step 366, the reference exposure conditions are corrected such that the measured density value corresponds to the target density value. In step 368, the parameters of a formula for determining the processing solution state are changed in accordance with the corrected reference exposure conditions. The processing solution state determining formula is a mathematical expression in which the print image density Dpi is expressed as a function of the film image density Dfi and the exposure conditions E. An example of this formula is shown by following formula (5).

$$Dpi = f(Dfi,)  \quad (5)$$

In step 368, by using the image density of the reference negative film as the film image density Dfi and by using the corrected reference exposure conditions as the exposure conditions E, the parameters are changed such that the calculated results correspond to the target density value which serves as the print image density Dpi. In subsequent step 370, the formula for determining the processing solution state in which the parameters have been changed is stored in the memory 86A in correspondence with the lot notation of the photographic printing paper 74, and processing ends.

Figure 7:
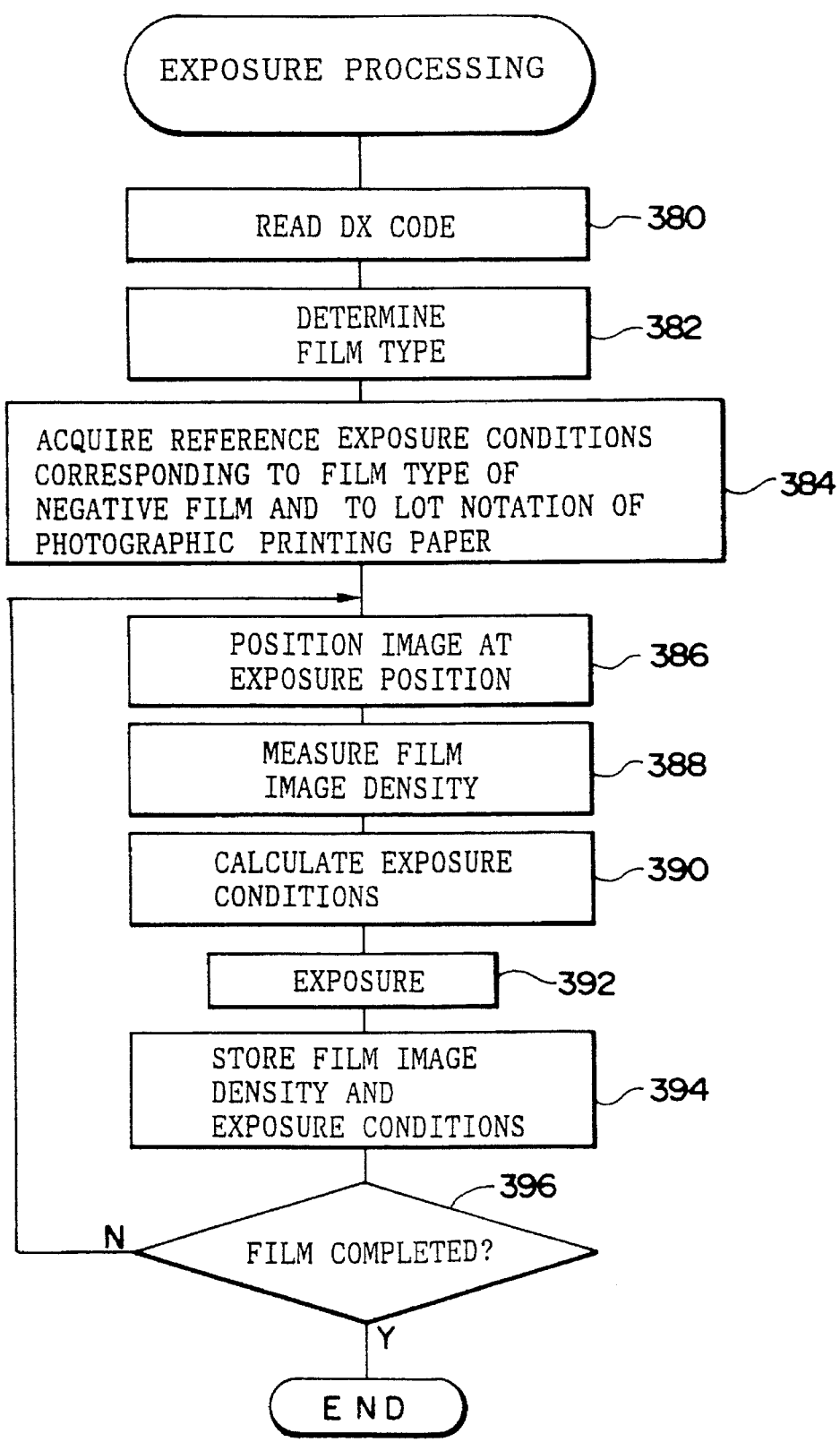
FIG. 7 is a flowchart for explaining exposure processing relating to the second embodiment.

Next, exposure processing carried out at the printer processor 64 will be explained with reference to the flowchart in FIG. 7. Exposure processing is executed when a photographed negative film 14, which has been brought in together with a request for simultaneous prints from a user and which has been processed at the film processor 10, is set at the negative carrier 80, or when a photographed and developed negative film 14, which has been brought in together with a request for additional prints from a user, is set at the negative carrier 80.

In step 380, the DX code recorded as a bar code on the negative film 14 is read by the bar code reader 82. In subsequent step 382, the film type of the negative film 14 set at the negative carrier 80 is determined on the basis of the read DX code. In next step 384, reference exposure conditions, which correspond to the film type of the negative film 14 and to the paper type and lot of the photographic printing paper 74 currently set at the printer processor 64, are acquired.

If, for example, the film type of the negative film determined in step 382 is the same as the film type of the reference negative film used during reference exposure condition setting, for the acquisition of the reference exposure conditions, the reference exposure conditions set in the previously described reference exposure condition setting processing are fetched. Further, when the film type of the set negative film 14 is different than the film type of the reference negative film, reference exposure conditions corresponding to the film type of the negative film 14 and to the paper type and lot of the photographic printing paper 74 are acquired by correcting the reference exposure conditions in accordance with the difference in film characteristics between the set negative film 14 and the reference negative film after the set reference exposure conditions are fetched once, or the like.

In step 386, an image of the negative film 14 is positioned at the exposure position, and in step 388, the densities of the three colors of the positioned image are measured by the photometer 84. In step 390, the exposure conditions are calculated by correcting the above-mentioned reference exposure conditions in accordance with the measured density value of the image. In step 392, in accordance with the calculated exposure conditions, operation of the light-adjusting filter portion 66 and the shutter is controlled, and the positioned image is exposed onto the photographic printing paper 74 at the calculated exposure conditions. In step 394, the film image density measured in step 388 and the exposure conditions calculated in step 390 are stored in correspondence in the memory 86A.

Exposure processing for a single image is completed by the above processes. In subsequent step 396, a determination is made as to whether exposure processing for the negative film 14 has been completed, i.e., as to whether exposure has been completed for all of the images on the negative film 14. If the answer to the determination in step 396 is "No", the process returns to step 386 and steps 386 through 396 are repeated until the answer to the determination in step 396 is "Yes". When the answer to the determination in step 396 is "Yes", processing is completed.

Figure 8:
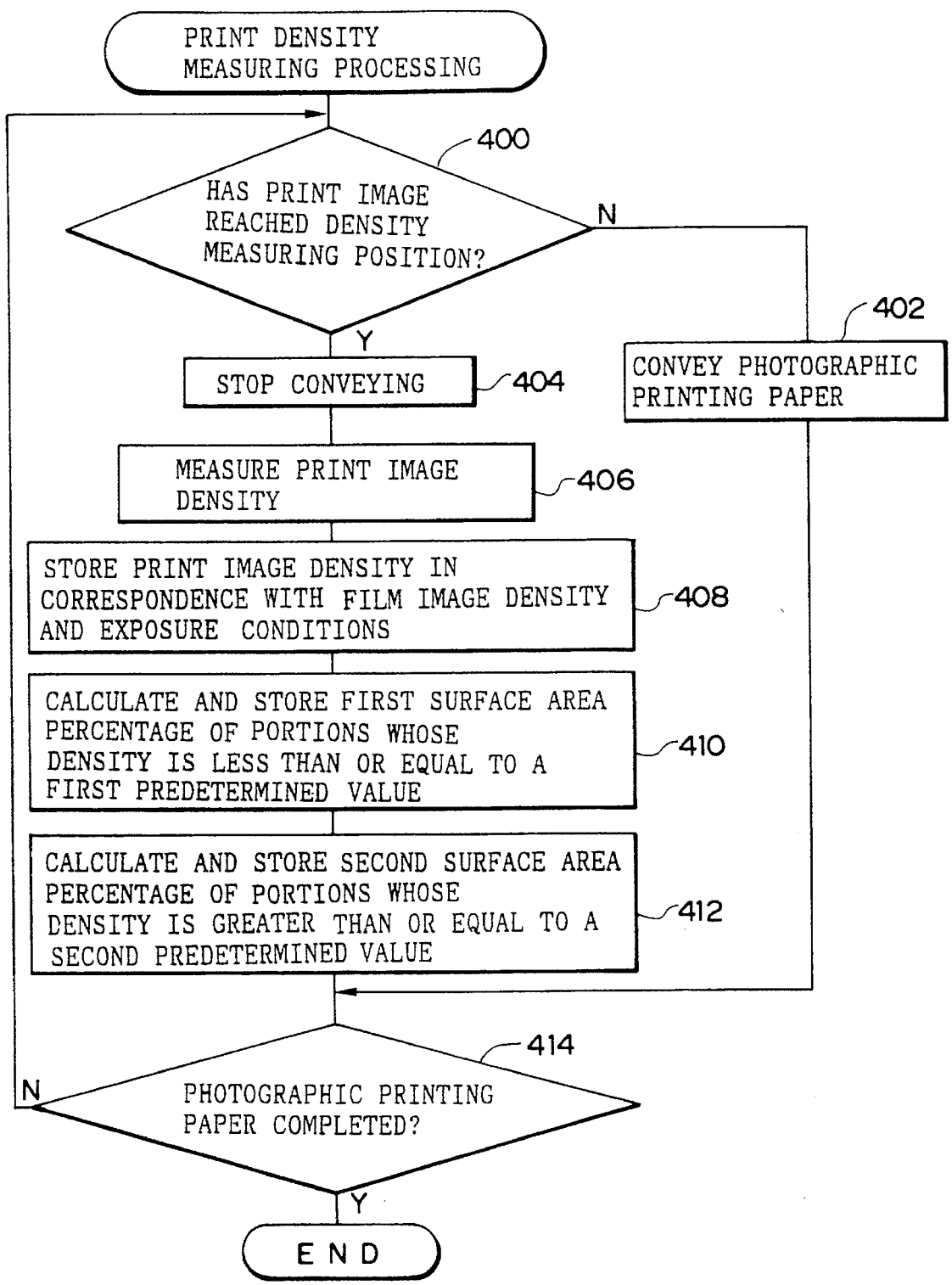
FIG. 8 is a flowchart for explaining print density measuring processing relating to the second embodiment.

Next, print density measuring processing which is executed in parallel with the above-described exposure processing will be described with reference to the flowchart in FIG. 8. As described above, after the photographic printing paper 74, onto which images have been exposed, is immersed in the respective processing solutions in the processor section 64B so as to be processed, the photographic printing paper 74 is dried and is then conveyed to the density measuring position of the densitometer 104.

In step 400, a determination is made as to whether a print image on the photographic printing paper 74 has reached the density measuring position at which density is measured by the densitometer 104. If the answer to the determination in step 400 is "No", the conveying of the photographic printing paper 74 is continued in step 402. In step 414, a determination is made as to whether processing has been completed, based on whether the trailing end of the photographic printing paper 74 has reached the densitometer 104. If the answer to the determination in step 414 is "No", the process returns to step 400, and the conveying of the photographic printing paper 74 is continued until a print image reaches the density measuring position.

When a print image reaches the density measuring position, the answer to the determination in step 400 is "Yes". In step 404, the conveying of the photographic printing paper 74 is stopped temporarily, and in step 406, the density of the print image is measured for each color by the densitometer 104. In step 408, the measured print image density is stored in the memory 86A in correspondence with the film image density and the exposure conditions which were stored during the previously-described exposure processing. In step 410, by using the results of measurement of the print image density obtained in step 406, the percentage of surface area (first surface area percentage) of the print image occupied by portions whose density is less than or equal to a first predetermined value is calculated, and is stored in the memory 86A. In step 412, the percentage of surface area (second surface area percentage) of the print image occupied by portions whose density is greater than or equal to a second predetermined value is calculated in the same way, and is stored in the memory 86A.

In subsequent step 414, a determination is made as to whether density measurement has been completed for the print images of the photographic printing paper 74, based on whether the trailing end of the photographic printing paper 74 has reached the density measuring position. If the answer to the determination in step 414 is "No", the process returns to step 400, and steps 400 through 414 are repeated until the answer to the determination in step 414 is "Yes". When the answer to the determination in step 414 is "Yes", print density measuring processing is completed.

The processing solution state determining processing relating to the second preferred embodiment will now be described with reference to the flowchart in FIGS. 9A and 9B. The processing solution state determining processing is executed at the control device 86 periodically each time a predetermined period of time passes. In step 420, the surface area of the photographic printing paper 74 processed at the processor section 64B of the printer processor 64 since the processing solution state determining processing was executed the previous time is fetched. In step 422, the temperature of the color developing solution detected by the temperature sensor 122 is fetched, and in step 424, the pH of the color developing solution detected by the pH sensor 124 is fetched. In step 426, the amount of replenishing solutions replenished to the developing tank 94A since the previous cycle is fetched. In step 428, the average strength of the mixing of the color developing solution by the mixer 114 since the previous cycle is fetched. The respective fetched data are stored in the memory 86A.

The processed surface area of the photographic printing paper 74, the amount of replenishing solution replenished to the developing tank 94A, and the strength of the mixing of the color developing solution correspond to variables which effect the composition of the processing solution in the present invention. The temperature and the pH of the color developing solution correspond to variables which express the characteristics of the processing solution in the present invention.

In subsequent step 430, the film image densities, the exposure conditions, and the print image densities, which were all stored during a predetermined period of time for photographic printing papers of the same lot for which exposure processing was effected, are fetched. This predetermined period of time may be a portion of the period of time since the last processing was effected, or may be the entire time since the last processing was effected. In step 432, the respective average values of the fetched film image densities, exposure conditions and print image densities are calculated. In next step 434, the calculated average values of the film image densities and the exposure conditions are substituted into the processing solution state determining formula (see formula (5)) whose parameters were set in the previously-described reference exposure condition setting processing, and the print image density Dpi is calculated. The print image density value Dpi derived from this calculation is a print image density value (hereinafter, print image reference density) which assumes that the state of the processing solution is a standard state. By comparing this print image reference density with the average value of the print image densities calculated in step 432, the state of the processing solution can be evaluated.

In subsequent step 436, the average value of the first surface area percentages, which were calculated and stored in the previously-described print density measuring processing, is calculated. Similarly, in step 436, the average value of the second surface area percentages is calculated. In step 438, a determination is made as to whether the state of the processing solution at the printer processor 64 is appropriate, based on the evaluation value of the processing solution state calculated in step 434, the average values of the first surface area percentages and the second surface area percentages calculated in step 436, and the respective information fetched in steps 420 through 428. This determination can be made on the basis of whether the difference between the print image reference density and the average value of the actual print image density values, and the average value of the first surface area percentages, and the average value of the second surface area percentages, and the respective information mentioned above respectively fall within predetermined ranges which are selected in advance.

When the answer to the determination in step 438 is "Yes", processing ends, but when the answer is "No", analysis of the reason for the change in the state of the processing solution is carried out in step 440. For example, with regard to the average values of the first surface area percentages and the second surface area percentages, in the same way as in the first embodiment, when the average value of the first surface area percentages is small, it can be determined that the degree of activity of the color developing solution has decreased. When the average value of the second surface area percentages is large, it can be determined that unsatisfactory desilverization has occurred or the temperature of the color developing solution has risen. Further, the degree of activity of the color developing solution is related to the processed surface area of the photographic printing paper 74. As the processed surface area increases, the degree of activity decreases. Therefore, if the above determination is made with the processed surface area taken into consideration, the exactitude of the determination of the reason behind the change in the state can be improved.

When Fuji Color Paper Process CP-40FA (trade name) is used as the processing solution and Fuji Color Paper SUPER FA II (trade name) is used as the photographic printing paper, the density (LD) of the low density portions for each of R, G, B, the contrast (the density HD of the high density portions—the density LD of the low density portions), and the stain respectively vary as illustrated in FIGS. 10A through 13C when various types of factors are varied. These factors are the developing time by the color developing solution, the temperature of the color developing solution, the pH of the color developing solution, the strength of mixing the color developing solution, the amount of replenishing solution replenished to the color developing solution, the proportion of bleaching/fixing solution mixed in the color developing solution, and the concentrations of $Fe^{2+}$, $Ca^{2+}$ and $Mg^{2+}$, and $Cu^{2+}$ mixed in the color developing solution.

The respective relations illustrated in the figures vary in accordance with the type of the developing solution and the paper type of the photographic printing paper 74. Each relation for each combination of processing solution and photographic printing paper type is stored in the memory 86A or the like in advance. If the average value of each color of the actual print image densities varies, with respect to the print image reference density (corresponding to the density illustrated as "normal" in FIGS. 10 through 13), so as to match or approximate any of these relations, it can be determined that the factor corresponding to that relation has varied. Further, the variables of the temperature of the color developing solution, the pH of the color developing solution, the mixing strength of the color developing solution, and the amount of replenishing solution replenished to the color developing solution are detected values fetched in steps 422 through 428. Therefore, the determination should be made with these detected values also taken into consideration. In this way, the exactitude of the determination of the reason behind the change in state can be improved.

In subsequent step 442, parameters corresponding to the maintaining/managing conditions of the processing solution are changed and set in accordance with the cause of the change in the state of the processing solution determined as described above. For example, if it is determined that the temperature of the color developing solution is high, it can be thought that, for example, a rise in temperature in the room in which the printer processor 64 is disposed is the reason behind the high temperature of the color developing solution. Therefore, the target temperature of the color developing solution is changed and set so as to become low. In this way, the maintaining/managing conditions of the processing solution are changed so that the state of the processing solution is adjusted to a standard state. By compensating for the change in the state of the processing solution, high-quality prints whose print image densities are the same or near the print image reference density can be obtained.

If the change in the state of the processing solution cannot be correctly sufficiently merely by changing the maintaining/managing conditions of the processing solution, it is necessary to change the processing solution or the like. Therefore, by displaying a message on the display 106 stating that the processing solution needs to be changed, the operator is urged to change the processing solution.

In subsequent step 444, a determination is made as to whether it is necessary to change the exposure conditions. Generally, prints of good quality can be obtained if the maintaining/managing conditions of the processing solution are changed in accordance with the change in the state of the processing solution as in step 442. However, because a little time is required until the state of the processing solution changes, if in particular a long time is taken until the state of the processing solution is improved, the answer to the determination in step 444 is "Yes". In next step 446, the exposure condition correction amount for correcting the difference between the print image reference density and the average value of the actual print image densities is calculated.

This correction amount is used in the previously-described exposure processing. In the previous description, the exposure conditions are calculated by using the calculated exposure condition correction amount. Therefore, even if a long time is required until the state of the processing solution is improved, prints of good quality are obtained immediately after the implementation of the processing solution state determining processing.

In the second embodiment as well, the state of the processing solution is determined automatically without using a special film for condition management such as a control strip or the like, and the maintaining/managing conditions of the processing solution are changed automatically. Therefore, work involved in storing the control strip such that fogging or the like does not occur, in setting the control strip periodically at the film processor, and the like is not needed, and the state of the processing solution can be managed easily.

The specific gravity of the processing solution or the like may be detected as a variable expressing the characteristics of the processing solution. Further, in the above description, the color developing solution is used as an example of the processing solution for which variables are detected. However, detection may be effected for other processing solutions such as bleaching/fixing solution or the like. Moreover, in the film processor 10 described in the first embodiment, in the same way as described above, variables effecting the composition of the processing solution and variables expressing the characteristics of the processing solution may be detected, and the state of the processing solution may be determined by using the detected variables.

The above description includes an example in which the state of the processing solution is determined on the basis of the print image densities, the exposure conditions and the film image densities. However, the determination of the state of the processing solution at the printer processor 64 is not limited to the same, and the state of the processing solution may be determined as follows. For example, a predetermined length of the photographic printing paper 74 is pulled out from the paper magazine 76 and is cut. The cut photographic printing paper 74 is, without being exposed, immersed in the various processing solutions in the processor section 64B so as to be processed, and thereafter is dried. Measuring of the densities of each color of the photographic printing paper a plural number of times is carried out periodically. The state of the processing solution is determined in the same way as in the first embodiment on the basis of the average value of the densities of the unexposed photographic printing paper 74 measured a plurality of times.

Here, if measured values which are greater than or equal to a predetermined value are excluded from the calculation of the average value and from use in the determination of the state of processing solution, erroneous determination of the state of the processing solution due to dirt adhering to the surface of the photographic printing paper 74 or the like can be prevented. Further, the exactitude of the determination of the state of the processing solution can be improved if variables effecting the composition of the processing solution and variables expressing the characteristics of the processing solution described in the second embodiment are detected in addition to the above-described densities of the unexposed photographic printing paper 74, and these variables also are used to determine the state of the processing solution.

In the above description, the reference exposure conditions are changed and set each time the lot of the photographic printing paper 74 or the film type of the negative film 14 or the like is changed. However, the present invention is not limited to the same, and a plurality of types of reference exposure conditions can be stored in accordance with the lot of the photographic printing paper 74, the film type of the negative film 14, or the like. The reference exposure conditions corresponding to the lot of the photographic printing paper 74 set at the printer processor 64 and to the film type of the negative film 14 set at the printer processor 64 and the like can be read and used.

When the above-described structure is used, it is necessary to set and store a very large number of reference exposure conditions in accordance with the combinations of film types and lots. Therefore, a storage medium having an extremely large capacity must be provided in order to store the reference exposure conditions, and the cost of the device increases. In order to overcome this drawback, the number of reference exposure conditions which can be stored on the storage medium is restricted. When it becomes necessary to use reference exposure conditions which are not stored on the storage medium, the reference exposure conditions are newly set by the processing shown in FIG. 6. If there is an empty area on the storage medium, the newly set reference exposure conditions are stored in the empty area. If the storage medium is full, the reference exposure conditions having the longest time from the time of last use thereof or the reference exposure conditions least frequently used are erased from the storage medium, and the newly set reference exposure conditions are stored.

Further, the image density measured by the photometer 84 provided in order to determine the exposure conditions is used as the density of the image recorded on the negative film 14. However, the present invention is not limited to the same. The image density measured in the film processor 10 described in the first embodiment may be received online or via a recording medium such as a memory card or the like, and then used.

[Third Embodiment]

Figure 14:
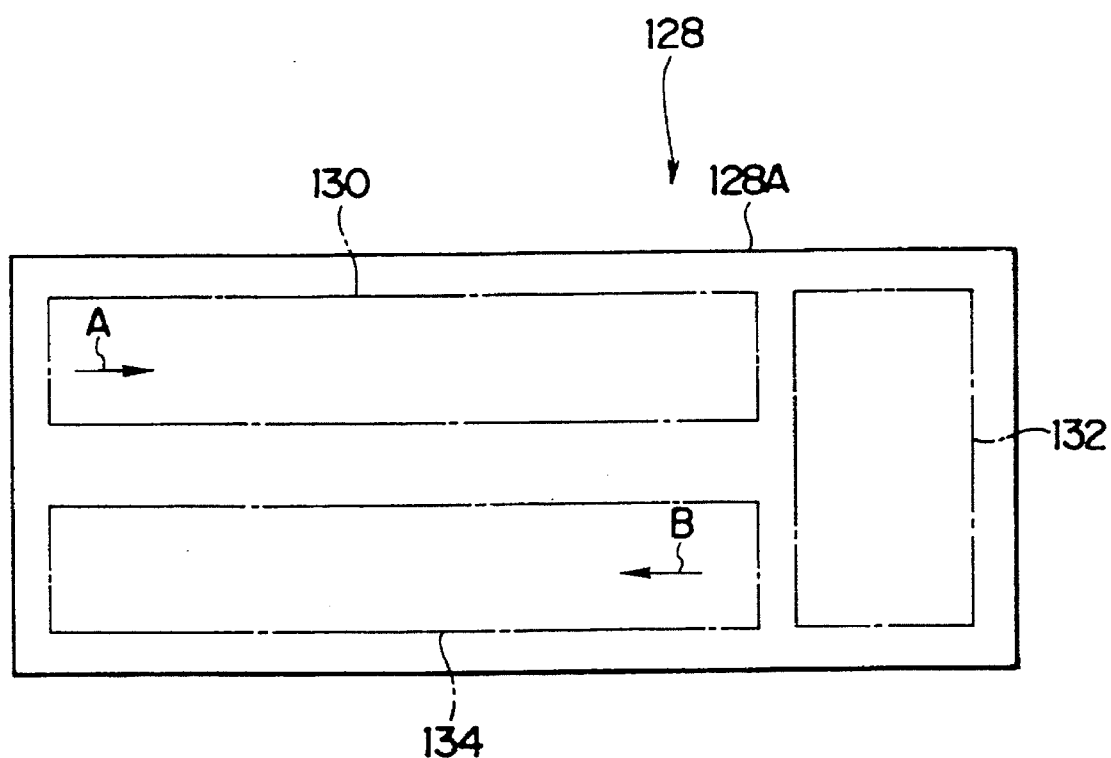
FIG. 14 is a schematic structural view of a photographic processing device relating to a third embodiment.

A third embodiment of the present invention will now be described. Portions which are the same as those of the first embodiment and the second embodiment are denoted by the same reference numerals, and description thereof is omitted. The schematic structure, as viewed from above, of a photographic processing device 128 relating to the third preferred embodiment is illustrated in FIG. 14. The photographic processing device 128 is structured such that a film processor section 130, a printer section 132, and a paper processor section 134 are integrally accommodated within a casing 128A whose interior is shielded from light.

Figure 15:
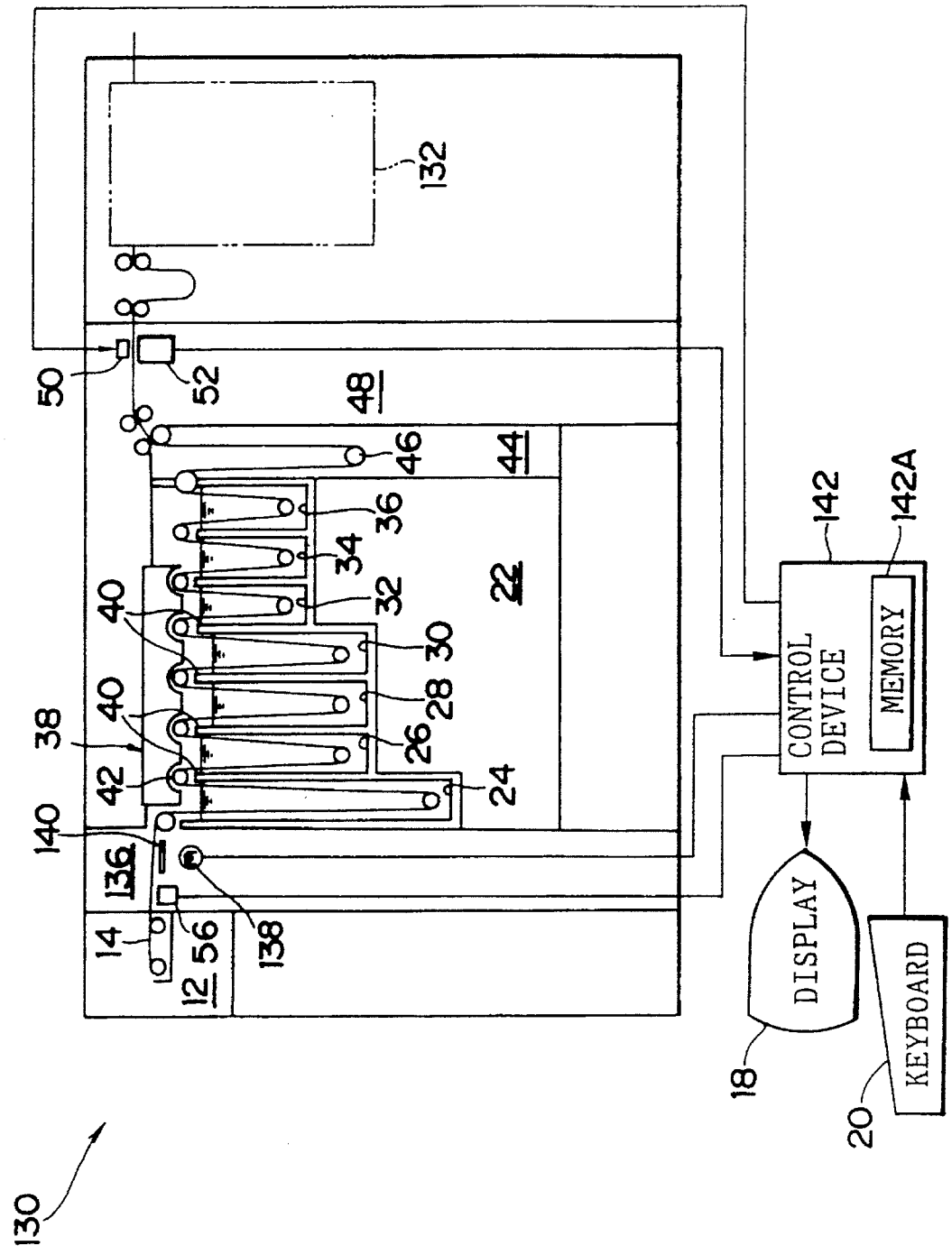
FIG. 15 is a schematic structural view of a film processor section of the photographic processing device of FIG. 14.

As illustrated in FIG. 15, the film processor section 130 is structured substantially the same as the film processor 10 described in the first preferred embodiment. However, the film processor section 130 differs in that a reference image exposure section 136 is provided between the film loading section 12 and the developing tank 24. An exposure lamp 138, which is disposed so that light is illuminated to the negative film 14 passing through the reference image exposure section 136, a reference film 140, which is disposed between the exposure lamp 138 and the conveying path of the negative film 14, and the bar code reader 56, which reads the bar code recorded on the negative film 14, are provided in the reference image exposure section 136.

A reversal film, for example, on which a reference image is recorded can be used as the reference film 140. The exposure lamp 138 of the reference image exposure section 136 is connected to a control device 142 of the photographic processing device 128, and the operation of the exposure lamp 138 is controlled by the control device 142. The bar code reader 56 is also connected to the control device 142, and outputs information expressing the read bar code to the control device 142. A nonvolatile memory 142A is provided in the control device 142. The display 18 and the keyboard 20 are connected to the control device 142.

The negative film 14 pulled out from the film loading section 12 passes through the reference image exposure section 136, and thereafter, is immersed in and processed by processing solutions stored in respective processing tanks while being conveyed in the direction of arrow A in FIG. 14. After the negative film 14 is dried in a drying section 44, the density of the film image is measured at the density measuring section 48, and the negative film 14 is sent into the printer section 132.

The printer section 132 is structured the same as the printer section 64A of the printer processor 64 described in the second preferred embodiment, except that the photometer 84, the bar code reader 82, the plate 81 and the driving device 83 are omitted from the printer section 132, and that the light-adjusting filter portion 66 and the read sensor 78 are connected to the control device 142 of the photographic processing device 128. The photographic printing paper 74 is pulled out from the paper magazine 76, and the exposure conditions are calculated on the basis of the film image density measured at the density measuring section 48 of the film processor section 130. The image of the negative film 14 positioned at the exposure position is exposed onto the photographic printing paper 74 at the calculated exposure conditions. The photographic printing paper 74 on which the image has been exposed is sent into the paper processor section 134.

The paper processor section 134 is structured the same as the processor section 64B of the printer processor 64 described in the second preferred embodiment, except that the densitometer 104 is connected to the control device 142 of the photographic processing device 128. While being conveyed in the direction of arrow B in FIG. 14, the photographic printing paper 74 sent into the paper processor section 134 is immersed in and processed by processing solutions stored in respective processing tanks, and is dried in the drying section 100. After the photographic printing paper 74 passes by the region at which the densitometer 104 is disposed, the photographic printing paper 74 is cut into image frame units at the cutter section 102. The cut image frames are discharged to the exterior of the casing 128A of the photographic processing device 128.

Next, operation of the third preferred embodiment will be described. At the film processor section 130 of the photographic processing device 128, the bar codes of a plurality of negative films 14 processed successively at the film processor 130 are read by the bar code reader 56. The film types are determined on the basis of the read bar codes. If the determined film type is a predetermined film type selected in advance, the conveying of the negative film 14 is stopped temporarily when a predetermined, unexposed portion of the negative film 14 outside of the image region (e.g., the leading end or the trailing end of the negative film 14 or the like) reaches the reference image exposure position of the reference image exposure section 136 (i.e. the position at which the exposure lamp 138 is disposed). The exposure lamp 138 is lit, and the reference image recorded on the reference film 140 is exposed onto the portion of the negative film 14 outside of the image region.

At the density measuring section 48 of the film processor section 130, the densities of the images on the negative film 14, which has been immersed in and processed by the respective processing solutions and which has been dried in the drying section 44, are successively measured by the densitometer 52. Further, for negative films 14 of the predetermined film type, the density of the reference image which was exposed onto the portion outside of the image region at the reference image exposure section 136 is also measured (hereinafter, this density will be referred to as the film reference image density). The image densities measured at the densitometer 52 are stored in the memory 142A of the control device 142.

The negative films 14 processed in the film processor section 130 are successively sent to the printer section 132. As described previously, in the printer section 132, the images recorded on the negative film 14 are successively exposed onto the photographic printing paper 74 at the exposure conditions calculated on the basis of the film image densities measured at the density measuring section 48 of the film processor section 130. For negative films 14 of the predetermined film type, the reference images recorded on portions outside of the image regions are also exposed onto the photographic printing paper 74, and the exposure conditions are stored in the memory 142A.

In the paper processor section 134, when the portion of the photographic printing paper 74 on which the reference image is exposed reaches the position at which the densitometer 104 is disposed after being immersed in and processed by the respective processing solutions and then dried, the conveying of the photographic printing paper 74 is temporarily stopped. The density of the reference image is measured for each color by the densitometer 104, and the measured density is stored in the memory 142A (hereinafter, this density will be referred to as the print reference image density).

At the control device 142, the stored film reference image densities and exposure conditions at the time of exposing the reference image on the negative film 14 onto the photographic printing paper 74 are fetched. First, in the same way as step 340 and steps thereafter in FIG. 2B described in the first preferred embodiment, by using the film reference image densities, the state of each processing solution in the film processor section 130 is determined. When the state of a processing solution is not appropriate, the maintaining/managing conditions of the processing solution in the film processor solution 130 are changed. Next, in the same way as step 434 and steps thereafter in FIGS. 9A and 9B described in the second preferred embodiment (with the exception of step 436), by using the film reference image densities, the exposure conditions and the print reference image densities, the state of the processing solution in the paper processor section 134 is determined. If the state of a processing solution is not appropriate, the maintaining/managing conditions of the processing solution in the paper processor section 134 are changed, and if necessary, the correction amount of the exposure conditions is calculated.

In this way, in the third preferred embodiment as well, in the same way as in the first and second preferred embodiments, the state of the processing solution is determined automatically without using a special film for condition management such as a control strip or the like, and the maintaining/managing conditions of the processing solution are changed automatically. Therefore, work involved in storing the control strip such that fogging does not occur and in setting the control strip periodically at the film processor and the like is not needed, and the state of the processing solution can be managed easily.

In the above description, the reference image exposure section 136 is provided in the film processor section 130 of the photographic processing device 128. The exposure of the reference image onto a portion of the negative film 14 outside of the image region is carried out in the reference image exposure section 136, i.e., is carried out immediately before the negative film is immersed in and processed by the respective processing solutions. However, the present invention is not limited to the same. A reference image may be exposed in advance during the stage of manufacturing the negative film 14 onto a portion of the negative film 14 at which no image will be exposed, or the reference image may be exposed at a camera during photographing. However, fogging may occur at the camera, or the state of the latent image of the reference image may gradually vary as the time which passes from the time the reference image is exposed increases. Therefore, it is preferable to expose the reference image immediately before the negative film 14 is immersed in and processed by the respective processing solutions.

[Fourth Embodiment]

A fourth preferred embodiment of the present invention will now be described. Portions which are the same as those of the first through the third embodiments are denoted by the same reference numerals, and description thereof is omitted. FIG. 16 illustrates a processing solution state management system 144 relating to the fourth embodiment. In FIG. 16, the film processor 10 described in the first embodiment and the printer processor 64 described in the second embodiment are respectively disposed in each of laboratories 146A through 146E.

Each of the laboratories 146A through 146E are connected to a management center 150 via a communication line 148 such as a telephone line or the like. The management center 150 is provided with a computer 152 for management. Sending and receiving of, for example, on-line data between the computer 152 for management and the film processors 10 and the printer processors 64 of the respective laboratories via the communication lines 148 is possible. The computer 152 for management includes a large-capacity, nonvolatile storage medium 152A formed by a hard disk or the like for storing various types of data.

Operation of the fourth preferred embodiment will now be described. Each time a predetermined period of time elapses, the computer 152 for management collects, via the communication lines 148, the average values of the film image densities (corresponding to the results of calculation of step 338 of FIG. 2B) measured and calculated at the film processors 10 of the respective laboratories 146. The average value of the average values of the collected film image densities is calculated, and the collected film image densities and the calculated average value of the film image densities is stored in the storage medium 152A. The film image densities collected from the film processors 10 of the laboratories 146 are compared with the calculated average value of the film image densities and with the progression of the average values which have previously been stored. In the same way as in step 340 of FIG. 2B, the state of the processing solution in the film processor 10 of each laboratory 146 is determined.

In a case in which the film image densities of a plurality of film processors 10 are used, when the overall hues and densities of images recorded on a plurality of negative films 14 brought into the respective laboratories 146 vary due to seasonal changes, the film image densities collected from the film processors 10 of the respective laboratories 146 vary in the same way. The average value of the film image densities calculated at the computer 152 for management also varies in accordance with the seasonal changes. Accordingly, only when the state of a processing solution of a specific film processor 10 varies do the film image densities collected from this specific film processor 10 deviate from the average value of the film image densities. Therefore, changes in the states of the processing solutions of the film processors 10 can be detected accurately.

Due to the regions in which the laboratories 146 are located, the average density and color balance of photographed images recorded on negative films 14 brought in with a request for developing or the like may differ greatly from the average density and the color balance of the photographed images recorded on negative films brought into another laboratory 146. For example, at a laboratory which is located near a ski resort, most of the photographed images will be ski scenes, especially in winter. The film image densities measured at the film processor 10 of the laboratory 146 located in such a region will be unbalanced with respect to the average value of the film image densities calculated at the computer 152 for management even if the states of the processing solutions are appropriate. Consequently, there is the possibility that the states of the processing solutions may be determined erroneously.

In order to overcome this drawback, in addition to merely comparing the film image densities collected from the film processors 10 of the respective laboratories 146 with the average value of the film image densities, it is preferable to determine the states of the processing solutions at the respective film processors 10 by also considering the changes in the film image densities measured at each film processor 10 as described in the first embodiment.

In the storage medium 152A of the computer 152 for management, reference exposure conditions are stored for each film type of the negative film 14 and for each paper type and lot of the photographic printing paper 74. At the printer processor 64 of each laboratory 146, before exposure processing, the film type of the set negative film 14 is detected by the bar code reader 82, and the paper type and lot of the set photographic printing paper 74 are detected by the read sensor 78, and it is determined whether reference exposure conditions corresponding to the film type of the negative film 14 and the paper type and lot of the photographic printing paper 74 are stored.

If the corresponding reference exposure conditions are stored, these conditions are read and used. However, if the corresponding reference exposure conditions are not stored, corresponding reference exposure conditions stored on the recording medium of the computer 152 for management are received from the computer 152 for management via the communication line 148. In this way, there is no need to provide a large capacity storage medium for storing many reference exposure conditions at each printer processor 64. Further, even in cases in which reference exposure conditions not stored in the printer processor 64 are needed, the reference exposure conditions can be acquired without carrying out reference exposure condition setting processing.

Figure 9A:
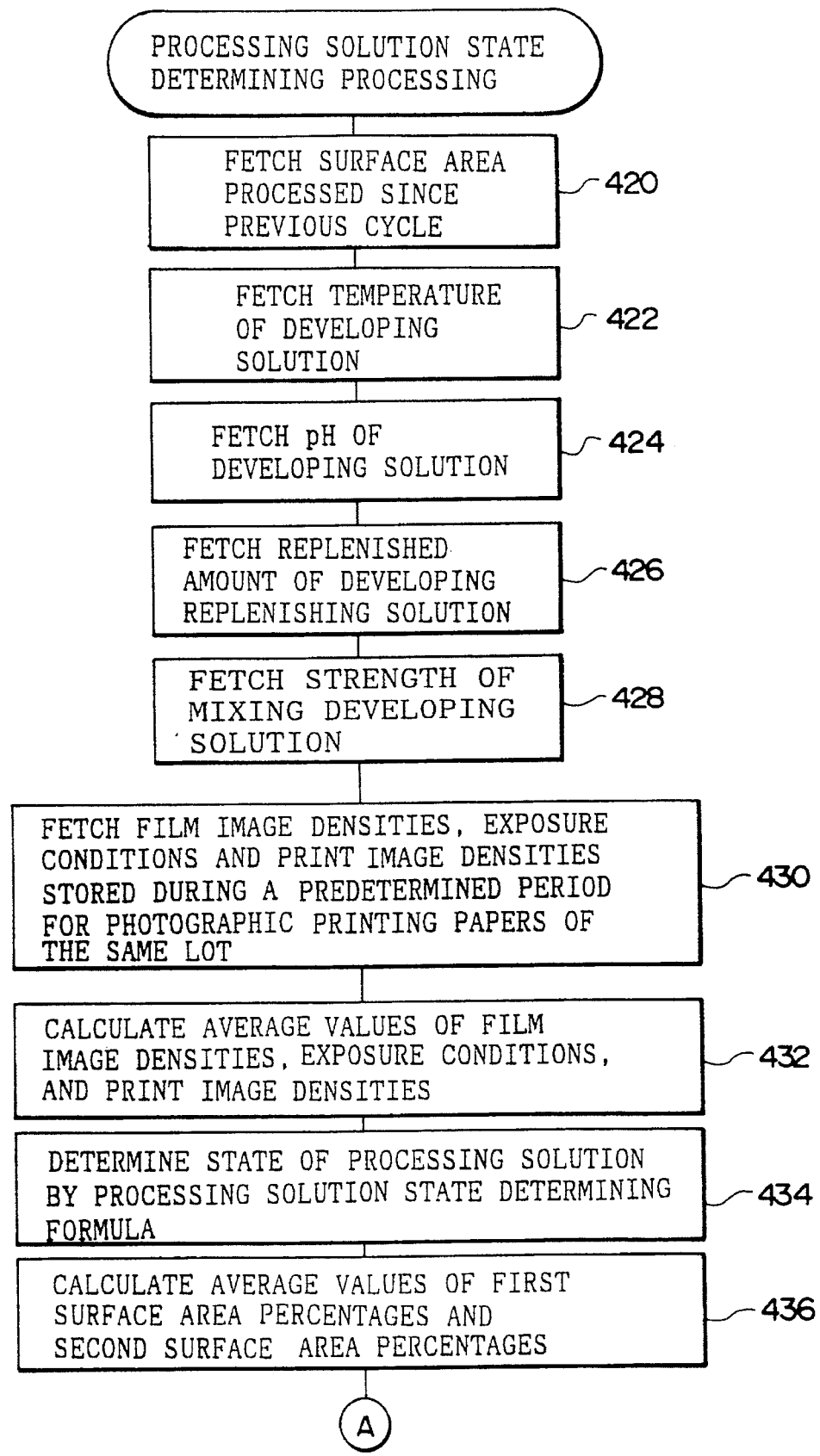
FIGS. 9A and 9B are flowcharts for explaining processing solution state determining processing relating to the second embodiment.
Figure 9B:
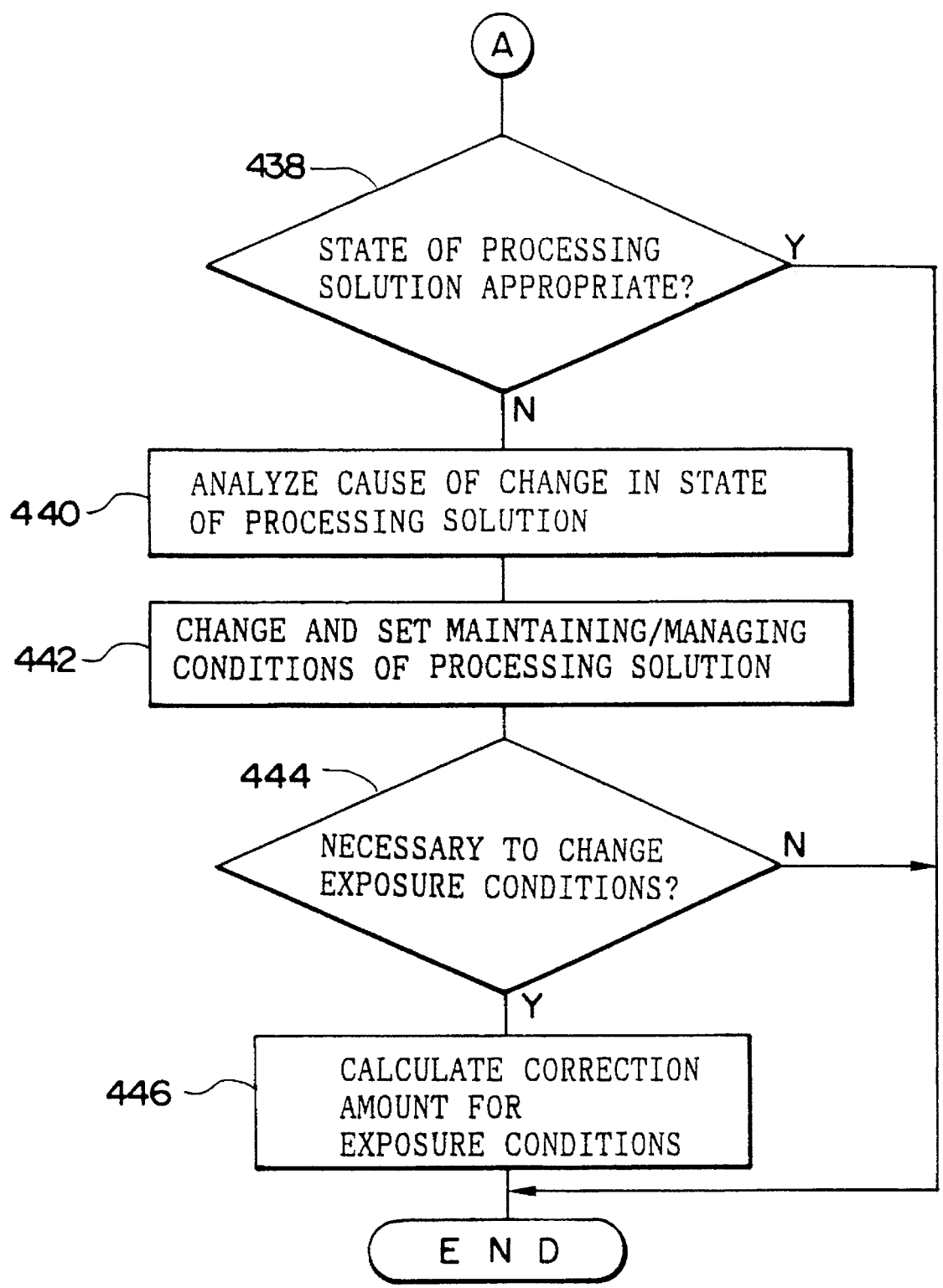

Each time a predetermined period of time passes, the computer 152 for management collects, via the communication lines 148, the average values of the film image densities, exposure conditions and print image densities measured and calculated by the printer processors 64 of the respective laboratories (corresponding to the results of calculation in step 432 of FIG. 9A) and the variables effecting the composition of the processing solution and the variables expressing the characteristics of the processing solution (corresponding to the data fetched in steps 420 through 428 of FIG. 9A). Then, in the same way as in steps 434 through 446 of FIGS. 9A and 9B described in the second preferred embodiment, the states of the processing solutions of the printer processors 64 of the respective laboratories 146 are determined. If there are printer processors 64 for which the state of the processing solution is not appropriate, the changed contents of the processing solution maintaining/managing conditions, and, if necessary, the correction amount of the exposure conditions are transmitted via the communication line 148.

The relations illustrated in FIGS. 10 through 13 between, on the one hand, the print image density, and on the other hand, the variables effecting the composition of the processing solution and the variables expressing the characteristics of the processing solution, differ for each type of processing solution and for each paper type of the photographic printing paper. Determining such relations by experimentation for all combinations of processing solution types and photographic printing paper types is difficult work requiring an extreme amount of time and effort. However, a large amount of information sent from the respective laboratories 146 is stored in the computer 152 for management. Therefore, if statistical analysis such as regression analysis is carried out by using this information, the relations illustrated in FIGS. 10 through 13 can be determined for each type of processing solution and each paper type of photographic printing paper 74.

The computer 152 for management calculates the average values of the collected film image densities, exposure conditions, and print image densities. Further, on the basis of the relation between the average value of the print image densities, the average value of the film image densities, and the average value of the exposure conditions, and on the basis of the difference between the average value of the print image densities and the predetermined reference density value, the computer 152 for management calculates the correction amount for correcting the average value of the exposure conditions, so that a print image of the reference density value is obtained on the photographic printing paper 74 from an image whose density corresponds to the average value of the film image densities. This correction amount is sent to the printer processors 64 of the respective laboratories 146, and the reference exposure conditions of the respective printer processors 64 are corrected.

In this way, even if the overall densities or color balances of film images vary due to variations in the photosensitive material for photographing, these variations in density or color balance are expressed as variations in the average value of the density values of each color of the film images, and the correction amount of the exposure conditions is calculated so that the film images are exposed onto the photographic printing paper 74 as images of appropriate densities. Accordingly, the reference exposure conditions of the printer processors 64 of the respective laboratories can be corrected appropriately regardless of changes in the photosensitive materials for photographing.

The respective film image densities measured at the respective laboratories 146 are stored in the computer 152 for management as described above. If these film image densities are stored per film type of the negative films 14 detected at the laboratories 146, an exposure condition correction amount per film type can be determined from the stored film image densities for each film type. Photographic films having various different characteristics corresponding to film design concepts, uses of the film and the like have been developed and manufactured, and currently, there are several tens of types of photographic films. However, condition setting films are provided for only an extremely limited number of film types among these many film types. Appropriate setting of the exposure conditions for these films has been difficult because no data is accumulated for new films which have just begun to be manufactured.

Accordingly, if the film image densities detected at the respective laboratories 136 are stored per film type as described above, even if a film is a new film which has just begun to be manufactured, a large number of image density data can be obtained in a short period of time. From this large number of image density data, the appropriate exposure conditions can be obtained on the basis of, for example, the average value of a large number of image density data of a film type which is the same as the negative film whose images are exposed, and density data of the images which are exposed. The calculation of the exposure conditions can be carried out, for example, in the following manner disclosed in Japanese Patent Application Laid-Open No. 2-93448. The image densities are calculated by using, among density data of images to be exposed, the density data which belongs to a specific color region set on the basis of the average value of the large number of image density data. Then, the exposure conditions are determined.

Further, in the above description, communication between the respective laboratories 146 and the management center 150 is carried out via the communication lines 148. However, the present invention is not limited to the same, and communication may be carried out by radio transmission or the like.

The above explanation includes an example in which the film processor 10 and the printer processor 64 are provided at each of the laboratories 146. However, instead, the photographic processing device 128 described in the third preferred embodiment may be provided.

Moreover, in the above description, the negative film 14 is used as an example of the photosensitive material for photographing. However, another photosensitive material such as a reversal film or the like may be used. Further, although the photographic printing paper 74 is used as the photosensitive material for printing in the above explanation, another photosensitive material can be used. The photosensitive material for printing is not limited to photosensitive materials for the exposure of images recorded on a photographic film.

What is claimed is:

1. A method for managing photographic processing conditions of an image forming device equipped with means for immersing a photosensitive material for photographing into a processing solution for photosensitive materials to process the photosensitive material for photographing, said method comprising the steps of:

for a photosensitive material for photographing, which has been used for photographing and on which an original image has been exposed and which has been immersed into and processed by a processing solution for photosensitive materials at said image forming device, dividing at least one of an image developed on the photosensitive material and a portion of the photosensitive material other than a portion comprising said image into a plurality of colors;

measuring a density of each of said colors;

storing a density value of each of said colors;

repeating the steps of dividing, measuring, and storing;

calculating, at predetermined intervals, an average value of density values stored in said storing step; and determining a state of the processing solution for photosensitive materials of said image forming device on the basis of an average value of said density values at one of said predetermined intervals.

2. The method according to claim 1, further comprising the steps of:

detecting at least one of variables which effect a composition of the processing solution for photosensitive materials and variables expressing characteristics of the processing solution for photosensitive materials; and determining the state of the processing solution for photosensitive materials by using detected variables.

3. The method according to claim 1, further comprising the step of detecting a type of photosensitive material and storing density values for each type of photosensitive material, and determining the state of the processing solution for said photosensitive material by using said density values.

4. The method according to claim 1, further comprising the steps of measuring the density of the portion of the photosensitive material, which is a photographic film, other than said portion comprising said image, and excluding the photographic films having density values which are less than or equal to a predetermined value and for which a number of data is less than or equal to a predetermined number.

5. The method according to claim 1, further comprising the steps of measuring density values for a specific type of photosensitive material, storing said density values, and determining the state of the processing solution for said specific type of photosensitive material by using said density values.

6. A method of managing photographic processing conditions of an image forming device equipped with means for immersing a photosensitive material for printing in a processing solution for photosensitive materials to process the photosensitive material for printing, said method comprising the steps of:

immersing an unexposed photosensitive material for printing into a processing solution for photosensitive materials for printing to process the photosensitive material in said image forming device;

dividing a density of the processed photosensitive material into a plurality of colors;

measuring the the density of each of said colors;

storing density values of each of said colors, respectively;

periodically repeating the steps of immersing, dividing, measuring, and storing; and determining a state of the processing solution for photosensitive materials for printing of said image forming device, on the basis of the density values stored in said storing step.

7. The method according to claim 6, further comprising the steps of:

detecting at least one of variables effecting a composition of the processing solution for said photosensitive materials for printing and variables expressing characteristics of the processing solution for said photosensitive materials;

determining the state of the processing solution for said photosensitive materials by using detected variables;

analyzing a cause of deviation from a standard state on the basis of said density values of each of said colors and said detected variables, when it is determined that the state of the processing solution for said photosensitive materials has deviated from the standard state; and changing, on the basis of results of said analyzing step, at least one of exposure conditions at a time of exposing an image onto said photosensitive material and maintaining/managing conditions of the processing solution for said photosensitive materials.

8. The method according to claim 7, wherein said analyzing step of the cause of deviation is carried out in accordance with the type of the processing solution for said photosensitive materials for printing.

9. A method for managing photographic processing conditions of an image forming device equipped with means for immersing a photosensitive material for printing into a processing solution for photosensitive materials for printing to process the photosensitive material, said method comprising the steps of:

for a photosensitive material for printing, on which an original image has been exposed at predetermined exposure conditions and which has been immersed into and processed by a processing solution for photosensitive materials for printing at said image forming device, dividing a density of an image developed on the photosensitive material into a plurality of colors;

measuring the density of each of said colors;

storing density values of the respective colors together with results of measuring density values of the original image for the respective colors and exposure conditions at the time the original image was exposed onto the photosensitive material;

repeating the steps of dividing, measuring, and storing; and determining a state of the processing solution of said image forming device on the basis of stored density values of the image on the photosensitive material, stored density values of the original image, and the stored exposure conditions.

10. The method according to claim 9, further comprising the steps of:

setting reference exposure conditions in said image forming device;

exposing said original image onto the photosensitive material at said reference exposure conditions;

calculating a value representing the state of the processing solution using a formula having parameters determined by said reference exposure conditions;

determining the state of the processing solution on the basis of said value, said density values of the image, one of the density values of of the original image and density values of a reference image on a photosensitive material, and on exposure conditions, and changing said parameters each time the reference exposure conditions are corrected.

11. The method according to claim 9, further comprising the steps of:

detecting at least one of variables effecting a composition of the processing solution for the photosensitive materials and variables expressing characteristics of the processing solution for photosensitive materials, determining the state of the processing solution by using detected variables;

analyzing a cause of deviation from a standard state on the basis of said density values of each of said colors and said detected variables, when it is determined that the state of the processing solution for photosensitive materials has deviated from the standard state; and changing, on the basis of results of said analyzing step, at least one of exposure conditions at a time of exposing an image onto said photosensitive material and maintaining/managing conditions of the processing solution for said photosensitive materials.

12. The method according to claim 11, wherein said analyzing step of the cause of deviation is carried out in accordance with the type of the processing solution for photosensitive materials.

13. A method for managing photographic processing conditions of an image forming device equipped with means for immersing a photosensitive material for photographing into a processing solution for photosensitive materials for photographing to process the photosensitive material, means for exposing an original image recorded on the photosensitive material for photographing onto a photosensitive material for printing, and means for immersing the photosensitive material for printing into a processing solution for photosensitive materials for printing to process the photosensitive material, said method comprising the steps of:

automatically immersing a photosensitive material for photographing, a portion of which includes a reference image has been exposed, into a processing solution for photosensitive materials for photographing to process the photosensitive material, automatically exposing the reference image developed on the photosensitive material for photographing onto a photosensitive material for printing at predetermined exposure conditions, automatically immersing an exposed photosensitive material for printing into a processing solution for photosensitive materials for printing to process the photosensitive material for printing, automatically dividing the densities of the reference image developed on the photosensitive material for photographing and the reference image developed on the photosensitive material for printing, respectively, into a plurality of colors, measuring the densities of each of said colors, automatically storing measured density values of the respective reference images for the respective colors and the predetermined exposure conditions; and determining a state of the processing solution for photosensitive materials for photographing on the basis of stored density values of the reference image on the photosensitive material for photographing, and determining a state of the processing solution for photosensitive material for printing on the basis of stored density values of the reference image on the photosensitive material for printing, the stored density values of the reference image on the photosensitive material for photographing, and stored exposure conditions.

14. The method according to claim 13, further comprising the steps of:

setting reference exposure conditions in said image forming device;

exposing said original image onto the photosensitive material at said reference exposure conditions;

calculating a value representing the state of the processing solution using a formula having parameters determined by said reference exposure conditions;

determining the state of the processing solution on the basis of said value, said density values of the image, one of the density values of of the original image and density values of a reference image on a photosensitive material, and on exposure conditions, and changing said parameters each time the reference exposure conditions are corrected.

15. The method according to claim 13, further comprising the steps of:

detecting at least one of variables which effect a composition of the processing solution for the photosensitive materials for photographing and variables expressing characteristics of the processing solution for photosensitive materials for photographing; and determining the state of the processing solution for photosensitive materials for photographing by using detected variables.

16. The method according to claim 13, further comprising the steps of detecting a type of photosensitive material and storing density values for each type of photosensitive material, and determining the state of the processing solution for said photosensitive material by using said density values.

17. The method according to claim 13, further comprising the steps of:

detecting at least one of variables effecting a composition of the processing solution for the photosensitive materials for printing and variables expressing characteristics of the processing solution for photosensitive materials for printing, determining the state of the processing solution by using detected variables;

analyzing a cause of deviation from a standard state on the basis of said density values of each of said colors and said detected variables, when it is determined that the state of the processing solution for photosensitive materials has deviated from the standard state; and changing, on the basis of results of said analyzing step, at least one of exposure conditions at a time of exposing an image onto said photosensitive material and maintaining/managing conditions of the processing solution for said photosensitive materials.

18. The method according to claim 17, wherein said analyzing step of the cause of deviation is carried out in accordance with the type of the processing solution for photosensitive materials.

19. The method according to claim 13 further comprising the steps of measuring density values for a specific type of photosensitive material, storing said density values, and determining the state of the processing solution for said specific type of photosensitive material by using said density values.

20. A method for managing image forming devices comprising the steps of:

periodically collecting state data expressing states of processing solutions of a plurality of image forming devices respectively equipped with means for immersing a photosensitive material in a processing solution to process the photosensitive material; and determining the states of the processing solutions of the plurality of image forming devices by comparing the respective state data of the image forming devices with an average value of the state data of the plurality of image forming devices.

21. An apparatus for managing image forming devices for managing method of a plurality of image forming devices respectively performing the steps of exposing an original image onto a photosensitive material for printing and immersing the photosensitive material for printing into a processing solution for photosensitive materials for printing to process the photosensitive material for printing, said apparatus comprising:

receiving means for receiving density values for each color of an image developed on a photosensitive material for printing by exposing an original image onto the photosensitive material for printing and by immersing and processing the photosensitive material for printing in a processing solution for photosensitive materials for printing at each of the plurality of image forming devices, and density values for each color of the original image at each of the plurality of image forming devices, and exposure conditions at the time when the original image is exposed onto the photosensitive material for printing at each of the plurality of image forming devices;

calculating means for calculating amounts of correction of the exposure conditions on the basis of values obtained by statistically processing the densities of images on the photosensitive materials for printing received from each of the plurality of image forming devices, the densities of the original images received from each of the plurality of image forming devices, and the exposure conditions received from each of the plurality of image forming devices; and correcting means for correcting the exposure conditions at the time of exposing images onto photosensitive materials for printing at each of the image forming thereto by the amounts of correction calculated by said calculating means.

22. The apparatus according to claim 21, wherein each of the plurality of image forming devices is provided with a detecting means for detecting the type of the photosensitive material for photographing on which the original image is recorded, and said receiving means also receives the types of the photosensitive materials for photographing on which the exposed original images are recorded, and said calculating means calculates an amount of correction of the exposure conditions for each type of photosensitive material for photographing.

23. An apparatus for managing image forming devices for managing each of a plurality of image forming devices respectively performing the steps of immersing a photosensitive material on which an image is exposed into a processing solution so as to process the photosensitive material, said apparatus comprising:

receiving means for receiving density values for respective colors of images developed on processed photosensitive materials and at least one of variables effecting compositions of processing solutions and variables expressing characteristics of processing solutions, the density values and variables being detected at each of the plurality of image forming devices;

determining means for determining states of the processing solutions of the respective image forming devices on the basis of information received from each of the plurality of image forming devices;

analyzing means for analyzing a cause of deviation from a standard state on the basis of said information received by said receiving means, in a case in which there is an image forming device for which it is determined by said determining means that the state of a processing solution has deviated from the standard state; and calculating means for determining, on the basis of results of analysis by said analyzing means, at least one of an amount of correction of exposure conditions at the time an image is exposed onto a photosensitive material and contents of change of maintaining/managing conditions of the processing solution.

\* \* \* \* \*